United States Patent
Hobbs et al.

(10) Patent No.: US 8,816,044 B2
(45) Date of Patent: Aug. 26, 2014

(54) FLEXIBLE POLYAMINES, FLEXIBLE AMINE-TERMINATED ADDUCTS, COMPOSITIONS THEREOF AND METHODS OF USE

(75) Inventors: Stephen J. Hobbs, Valencia, CA (US); Marfi Ito, Culver City, CA (US); Juexiao Cai, Stevenson Ranch, CA (US); Chandra Rao, Valencia, CA (US); Renhe Lin, Stevenson Ranch, CA (US)

(73) Assignee: PRC DeSoto International, Inc, Sylmar, CA (US)

( * ) Notice: Subject to any disclaimer, the term of this patent is extended or adjusted under 35 U.S.C. 154(b) by 238 days.

(21) Appl. No.: 13/238,515

(22) Filed: Sep. 21, 2011

(65) Prior Publication Data

US 2013/0071571 A1  Mar. 21, 2013

(51) Int. Cl.
*C08G 73/00* (2006.01)

(52) U.S. Cl.
USPC ........ 528/422; 724/385.5; 524/591; 525/473; 528/55; 528/68; 528/76; 528/423; 528/486; 528/487

(58) Field of Classification Search
USPC ........ 524/591; 528/55, 68, 76, 422, 423, 486, 528/487; 525/473; 427/385.5
See application file for complete search history.

(56) References Cited

U.S. PATENT DOCUMENTS

| | | |
|---|---|---|
| 2,466,963 A | 4/1949 | Patrick et al. |
| 3,920,617 A | 11/1975 | Hirosawa et al. |
| 4,146,688 A | 3/1979 | Schwindt et al. |
| 4,366,307 A | 12/1982 | Singh et al. |
| 4,609,762 A | 9/1986 | Morris et al. |
| 5,225,472 A | 7/1993 | Cameron et al. |
| 5,912,319 A | 6/1999 | Zook et al. |
| 5,959,071 A | 9/1999 | DeMoss et al. |
| 6,172,179 B1 | 1/2001 | Zook et al. |
| 6,232,401 B1 | 5/2001 | Zook et al. |
| 6,372,849 B2 | 4/2002 | DeMoss et al. |
| 6,509,418 B1 | 1/2003 | Zook et al. |
| 7,009,032 B2 | 3/2006 | Bojkova et al. |
| 7,622,548 B2 | 11/2009 | Rao et al. |
| 7,879,955 B2 | 2/2011 | Rao et al. |
| 2003/0125500 A1 | 7/2003 | Watanabe et al. |
| 2009/0012244 A1* | 1/2009 | Rao et al. ............ 525/452 |
| 2011/0092639 A1 | 4/2011 | Rao et al. |

FOREIGN PATENT DOCUMENTS

| | | |
|---|---|---|
| CA | 1082398 | 7/1980 |
| EP | 0433887 A2 | 6/1991 |
| EP | 2142586 A1 | 1/2010 |
| EP | 2148897 A1 | 2/2010 |

OTHER PUBLICATIONS

U.S. Appl. No. 13/050,988, filed Mar. 18, 2011, Hobbs et al.
U.S. Appl. No. 13/051,002, filed Mar. 18, 2001, Hobbs et al.
U.S. Appl. No. 61/453,978, filed Mar. 18, 2011, Hobbs et al.
Kumar et al., Synthetic ionophores part 19: Synthesis and ionophore character of 2-aminothiophenol based silver selective acyclic and cyclic receptors.*Tetrahedron* 1998, 54(21), 5575-5586.
Lomölder et al., Selectivity of isophorone diisocyanate in the urethane reaction influence of temperature, catalysis, and reaction partners. *J Coatings Technology* 1997, 69(868), 51-57.
Szczygelska-Tao and Biernat, New chromogenic azothiacrown ethers—synthesis and properties. *Polish J. Chem* 2002, 76(7), 931-936.

* cited by examiner

*Primary Examiner* — Gregory Listvoyb
(74) *Attorney, Agent, or Firm* — William R. Lambert

(57) ABSTRACT

Disclosed are flexible polyamines, flexible amine-terminated polyformal adducts, flexible-amine-terminated polythioether adducts, compositions comprising flexible polyamines and isocyanate-terminated prepolymers, and compositions comprising flexible amine-terminated adducts and isocyanate-terminated prepolymers. Uses of the compositions as sealants, and particularly as aerospace sealants, are also disclosed.

7 Claims, 1 Drawing Sheet

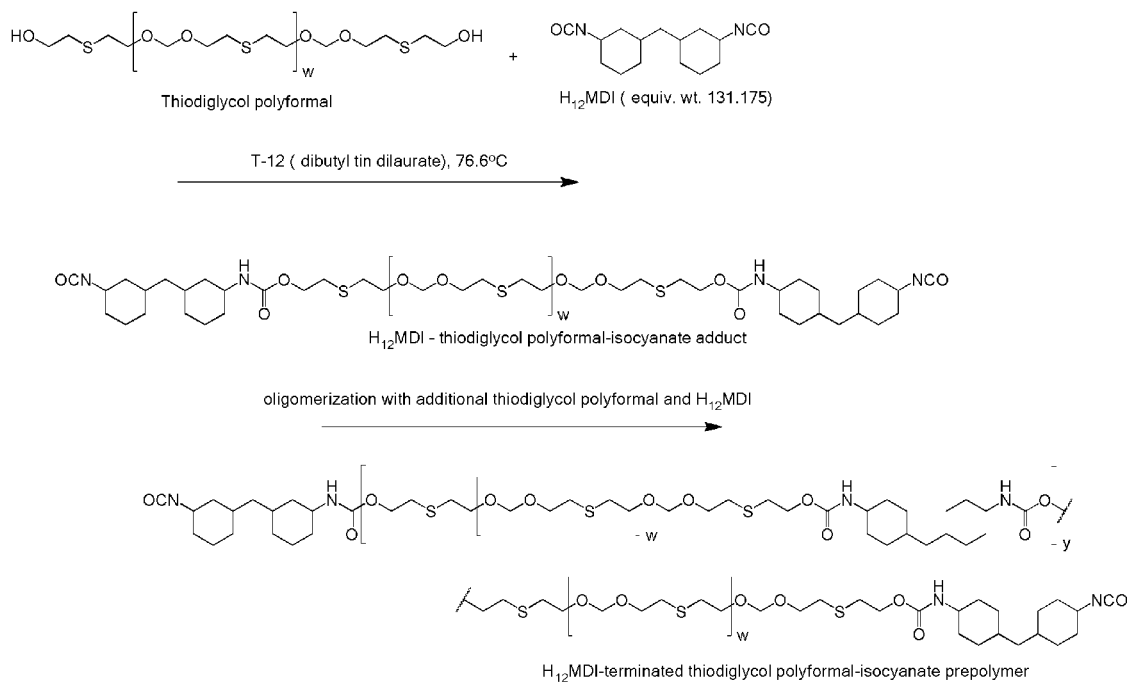

FLEXIBLE POLYAMINES, FLEXIBLE AMINE-TERMINATED ADDUCTS, COMPOSITIONS THEREOF AND METHODS OF USE

The present disclosure relates to flexible polyamines, flexible amine-terminated polyformal adducts, flexible amine-terminated polythioether adducts, compositions comprising flexible polyamines and isocyanate-terminated prepolymers, compositions comprising flexible amine-terminated adducts and isocyanate-terminated prepolymers, and methods of using the compositions as sealants, and in particular, as aerospace sealants.

Sulfur-containing isocyanate prepolymers are useful in aviation and aerospace sealant applications. When cured with aromatic amines, the resulting cured compositions exhibit long pot life, high tensile strength, high elongation, and excellent fuel resistance.

Thiol-terminated sulfur-containing polymers are known to be well-suited for use in various applications such as aerospace sealant compositions, due, in large part, to their fuel-resistance. Other desirable properties for aerospace sealant compositions include low temperature flexibility, short curing time (the time required to reach a predetermined strength), and excellent elevated-temperature resistance, among others. Sealant compositions exhibiting at least some of these characteristics and containing thiol-terminated sulfur-containing polymers are described, for example, in U.S. Pat. Nos. 2,466,963, 4,366,307, 4,609,762, 5,225,472, 5,912,319, 5,959,071, 6,172,179, 6,232,401, 6,372,849, and 6,509,418.

Polythioethers that are liquid at room temperature and pressure and that have excellent low-temperature flexibility and fuel resistance, such as disclosed in U.S. Pat. No. 6,172,179, are also useful in aerospace sealant applications. Difunctional, linear polythioethers, however, often swell upon prolonged exposure to hydrocarbon fuel and other lubricants. On the other hand, sealants made using polyfunctional polythioethers, can exhibit good fuel resistance, hardness, and flexibility, but often with compromised elongation. Polyfunctional polythioethers are disclosed, for example, in U.S. Pat. Nos. 6,172,179, 7,879,955, and 7,622,548.

Recently, polyformal-based sulfur-containing polymers that exhibit excellent properties for aerospace sealant applications have been developed as disclosed in U.S. application Ser. Nos. 13/050,988 and 13/051,002, and U.S. Provisional Application No. 61/453,978, filed on Mar. 18, 2011.

In certain cases, polyurethane, polythiourethane and polyurea compositions comprising sulfur-containing polymers, polythioethers, and/or polyformal polymers may be relatively hard, exhibiting, for example, a Shore A hardness of about 75 when fully cured. In order to enhance the adhesion of the compositions to aircraft and aerospace substrates, it is desirable that the hardness of the cured composition be less than about 75 Shore A and the cured composition exhibit greater flexibility.

Flexible diaminodipenyl-dithioethers have been used as chain extenders in polyurethane and polyurea systems as disclosed, for example, in Canadian Patent No. 1082398, Kumar et al., *Tetrahedron* 1998, 54(21), 5575-5586; and Szczygelska-Tao and Biernat, *Polish J. Chem* 2002, 76(7), 931-936.

Cured polyurethane and polyurea compositions comprising flexible polyamines and/or flexible amine-terminated adducts of polyformal polymers and polythioethers exhibit enhanced properties suitable for aerospace sealant applications including improved flexibility.

In a first aspect of the present disclosure, amine-terminated polyformal adducts selected from an adduct of Formula (4), an adduct of Formula (5), and a combination thereof are provided:

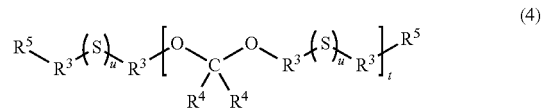

(4)

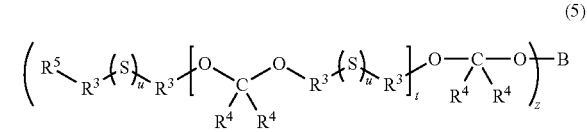

(5)

wherein:
each t is independently an integer selected from 1 to 50;
each u is independently selected from 1 and 2;
each $R^3$ is independently $C_{2-6}$ alkanediyl;
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl;
B represents the core of a z-valent polyol $B(OH)_z$, wherein z is an integer from 3 to 6; and
each $R^5$ is independently a group comprising F, wherein F is an amine-terminated group of Formula (1'):

$$A-Y-(CR^2_2)_p-[-O-(CR^1_2)_n-]_m-O-(CR^2_2)_p-Y-A'- \qquad (1')$$

wherein:
m is an integer from 0 to 4;
each n is independently an integer from 1 to 4;
each p is independently an integer from 1 to 4;
A is amino-substituted phenyl;
-A'- is

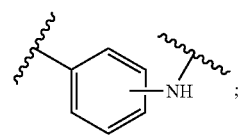

;

each Y is independently selected from O and S;
each $R^1$ is independently selected from hydrogen and $C_{1-3}$ alkyl; and
each $R^2$ is independently selected from hydrogen and $C_{1-3}$ alkyl.

In a second aspect of the present disclosure, amine-terminated polyformal adducts are provided comprising the reaction product of reactants comprising:
(a) a terminal-modified polyformal polymer comprising the reaction products of reactants comprising:
(i) a polyformal polyol selected from a polyol of Formula (6), a polyol of Formula (7), and a combination thereof:

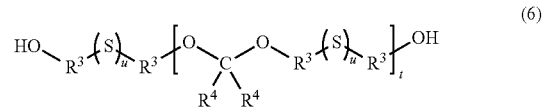

(6)

-continued (7)

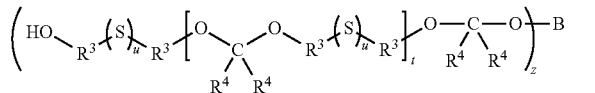

wherein:
each t is independently an integer selected from 1 to 50;
each u is independently selected from 1 and 2;
each $R^3$ is independently selected from $C_{2-6}$ alkanediyl;
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and
B represents the core of a z-valent polyol $B(OH)_z$, wherein z is an integer from 3 to 6; and
(ii) a compound comprising a terminal group selected from an ethylenically unsaturated group, an isocyanate group, and an epoxy group; and a group that is reactive with the terminal hydroxyl groups of the polyols of Formula (6) and Formula (7); and
(b) a polyamine of Formula (1):

A-Y—$(CR^2_2)_p$—[—O—$(CR^1_2)_n$—]$_m$—O—$(CR^2_2)_p$
—Y-A    (1)

wherein:
m is an integer from 0 to 4;
each n is independently an integer from 1 to 4;
each p is independently an integer from 1 to 4;
each A is independently amino-substituted phenyl;
each Y is independently selected from O and S;
each $R^1$ is independently selected from hydrogen and $C_{1-3}$ alkyl; and
each $R^2$ is independently selected from hydrogen and $C_{1-3}$ alkyl.

In a third aspect of the present disclosure, amine-terminated polythioether adducts selected from an adduct of Formula (13), an adduct of Formula (14), and a combination thereof are provided:

F—CH$_2$—CH(OH)—R$^{16}$—S—R$^{15}$—S—R$^{16}$—CH(OH)—CH$_2$—F    (13)

{F—CH$_2$—CH(OH)—R$^{16}$—S—R$^{15}$—S—R$^{16}$—CH(OH)—CH$_2$—V'—}$_z$B    (14)

wherein:
each $R^{15}$ is independently selected from $C_{2-10}$ alkanediyl, $C_{2-10}$ oxyalkanediyl, $C_{6-8}$ cycloalkanediyl, $C_{6-10}$ alkanecycloalkanediyl, $C_{5-8}$ heterocycloalkanediyl, and —[—$(CHR^{17})_s$—X—]$_q$—$(CHR^{17})_r$—; wherein
each $R^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10;
each $R^{16}$ is independently selected from $C_{3-20}$ alkanediyl and $C_{3-20}$ oxyalkanediyl;
B represents the core of a z-valent polyfunctionalizing agent $B(V)_z$, wherein:
z is an integer from 3 to 6; and
each V comprises a group that is reactive with an epoxy group;
each V' comprises a moiety resulting from the reaction of V with an epoxy group; and
each F is independently an amine-terminated group of Formula (1'):

A-Y—$(CR^2_2)_p$—[—O—$(CR^1_2)_n$—]$_m$—O—$(CR^2_2)_p$
—Y-A'-    (1')

wherein:
m is an integer from 0 to 4;
each n is independently an integer from 1 to 4;
each p is independently an integer from 1 to 4;
A is amino-substituted phenyl;
-A'- is

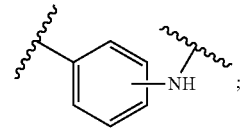

;

each Y is independently selected from O and S;
each $R^1$ is independently selected from hydrogen and $C_{1-3}$ alkyl; and
each $R^2$ is independently selected from hydrogen and $C_{1-3}$ alkyl.

In a fourth aspect of the present disclosure, amine-terminated polythioether adducts are provided comprising the reaction products of reactants comprising:
(a) an epoxy-terminated polythioether selected from a polythioether of Formula (15), a polythioether of Formula (16), and a combination thereof:

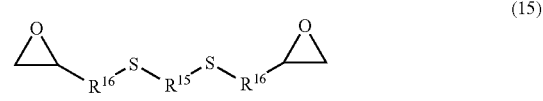

(15)

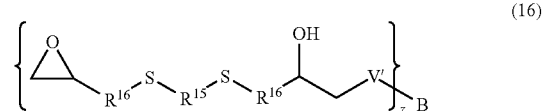

(16)

wherein:
each $R^{15}$ is independently selected from $C_{2-10}$ alkanediyl, $C_{2-10}$ oxyalkanediyl, $C_{6-8}$ cycloalkanediyl, $C_{6-10}$ alkanecycloalkanediyl, $C_{5-8}$ heterocycloalkanediyl, and —[—$(CHR^{17})_s$—X—]$_q$—$(CHR^{17})_r$—; wherein
each $R^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10;
each $R^{16}$ is independently selected from $C_{3-20}$ alkanediyl and $C_{3-20}$ oxyalkanediyl;
B represents the core of a z-valent polyfunctionalizing agent $B(V)_z$, wherein:
z is an integer from 3 to 6; and
V comprises a group that is reactive with an epoxy group; and V' comprises a moiety resulting from the reaction of V with an epoxy group; and (b) a polyamine of Formula (1):

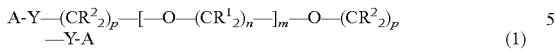

wherein:
  m is an integer from 0 to 4;
  each n is independently an integer from 1 to 4;
  each p is independently an integer from 1 to 4;
  each A is independently amino-substituted phenyl;
  each Y is independently selected from O and S;
  each $R^1$ is independently selected from hydrogen and $C_{1-3}$ alkyl; and
  each $R^2$ is independently selected from hydrogen and $C_{1-3}$ alkyl.

In a fifth aspect of the present disclosure, amine-terminated polythioether adducts selected from an adduct of Formula (20), an adduct Formula (21), and a combination thereof are provided:

$$F—R^{30}—R^{23'}—[R^{22}]_a\text{-}D\text{-}[R^{22}]_a—R^{23'}—R^{30}—F \qquad (20)$$

$$B(\text{-}D\text{-}[R^{22}]_a—R^{23'}—R^{30}—F)_z \qquad (21)$$

wherein:
  D has the structure of Formula (22);

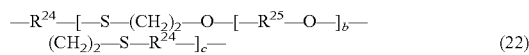

wherein:
    each $R^{24}$ is independently selected from $C_{2-6}$ alkanediyl, $C_{6-8}$ cycloalkanediyl, $C_{6-10}$ alkanecycloalkanediyl, $—[(CH_2)_s—X—]_q—(CH_2)_r—$, and $—[(CH_2)_s—X—]_q—(CH_2)_r—$ wherein at least one $—CH_2—$ group is substituted with a methyl group;
    each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(CH_2)_s—X—]_q—(CH_2)_r—$;
    each X is independently selected from —O—, —S— and —NR—, wherein R is selected from hydrogen and methyl;
    each b is independently an integer from 0 to 10;
    each c is independently an integer from 1 to 60;
    each s is independently an integer from 2 to 6;
    each q is independently an integer from 0 to 5; and
    each r is independently an integer from 2 to 10;
each a is independently selected from 0 and 1;
each $R^{22}$ is independently $—S—(CH_2)_2—[O—R^{25}]_b—O—$;
each $R^{23'}$ is independently selected from —S— and $—S—(CH_2)_{2+d}—O—R^{26'}—$ when a is 0, or from $—(CH_2)_2—S—R^{26'}—$ when a is 1, wherein:
  each d is independently an integer from 0 to 10; and
  each $R^{26'}$ is independently selected from $C_{1-6}$ alkanediyl and substituted $C_{1-6}$ alkyl wherein the at least one substituent is selected from —O— and —NR— wherein R is selected from hydrogen and $C_{1-6}$ alkyl;
B is a core of a z-valent polyfunctionalizing agent $B(R)_z$
  wherein:
    each R is independently selected from a group comprising a terminal group that is reactive with a —SH group and a group comprising a terminal group that is reactive with a $—CH=CH_2$ group; and
  z is an integer from 3 to 6;

each $R^{30}$ is a moiety selected from a moiety derived from a diisocyanate and a moiety derived from an ethylenically unsaturated group; and
each F is independently an amine-terminated group of Formula (1'):

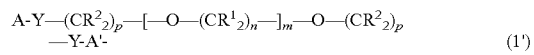

wherein:
  m is an integer from 0 to 4;
  each n is independently an integer from 1 to 4;
  each p is independently an integer from 1 to 4;
  A is amino-substituted phenyl;
  -A'- is

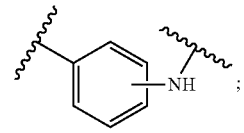

each Y is independently selected from O and S;
each $R^1$ is independently selected from hydrogen and $C_{1-3}$ alkyl; and
each $R^2$ is independently selected from hydrogen and $C_{1-3}$ alkyl.

In a sixth aspect of the present disclosure, amine-terminated polythioether adducts are provided comprising the reaction products of reactants comprising:
(a) an isocyanate-terminated polythioether comprising the reaction products of reactants comprising:
  (i) a polythioether selected from a polythioether of Formula (23), a polythioether of Formula (24), and a combination thereof:

$$R^{23}—[R^{22}]_a\text{-}D\text{-}[R^{22}]_a—R^{23} \qquad (23)$$

$$B(\text{-}D\text{-}[R^{22}]_a—R^{23})_z \qquad (24)$$

wherein:
  D has the structure of Formula (22);

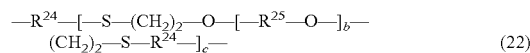

wherein:
    each $R^{24}$ is independently selected from $C_{2-6}$ alkanediyl, $C_{6-8}$ cycloalkanediyl, $C_{6-10}$ alkanecycloalkanediyl, $—[(CH_2)_s—X—]_q—(CH_2)_r—$, and $—[(CH_2)_s—X—]_q—(CH_2)_r—$ wherein at least one $—CH_2—$ group is substituted with a methyl group;
    each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(CH_2)_s—X—]_q—(CH_2)_r—$;
    each X is independently selected from —O—, —S— and —NR—, wherein R is selected from hydrogen and methyl;
    each b is independently an integer from 0 to 10;
    each c is independently an integer from 1 to 60;
    each s is independently an integer from 2 to 6;
    each q is independently an integer from 0 to 5; and
    each r is independently an integer from 2 to 10;
each a is independently selected from 0 and 1;
each $R^{22}$ is independently $—S—(CH_2)_2—[O—R^{25}]_b—O—$;

each $R^{23}$ is independently selected from —SH and —S—$(CH_2)_{2+d}$—O—$R^{26}$ when a is 0, or from —$(CH_2)_2$—S—$R^{26}$ when a is 1, wherein:
each d is independently an integer from 0 to 10; and
each $R^{26}$ is independently selected from $C_{1-6}$ alkyl and substituted $C_{1-6}$ alkyl wherein the at least one substituent is selected from —OH and —NHR wherein R is selected from hydrogen and $C_{1-6}$ alkyl;
B is a core of a z-valent polyfunctionalizing agent $B(R)_z$ wherein:
each R is independently selected from a group comprising a terminal group that is reactive with a —SH group and a group comprising a terminal group that is reactive with a —CH=$CH_2$ group; and
z is an integer from 3 to 6; and
(ii) a diisocyanate; and
(b) a polyamine of Formula (1):

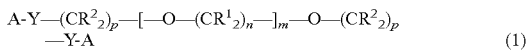

(1)

wherein:
m is an integer from 0 to 4;
each n is independently an integer from 1 to 4;
each p is independently an integer from 1 to 4;
each A is independently amino-substituted phenyl;
each Y is independently selected from O and S;
each $R^1$ is independently selected from hydrogen and $C_{1-3}$ alkyl; and
each $R^2$ is independently selected from hydrogen and $C_{1-3}$ alkyl.

In a seventh aspect of the present disclosure, compositions comprising the reaction products of reactants comprising (a) an amine-terminated adduct provided by the present disclosure; and (b) an isocyanate-terminated prepolymer are provided.

In an eighth aspect of the present disclosure, compositions are provided comprising the reaction products of reactants comprising: (a) an isocyanate prepolymer selected from an isocyanate-terminated polyformal prepolymer, an isocyanate-terminated polythioether prepolymer, and a combination thereof; and (b) a polyamine of Formula (1):

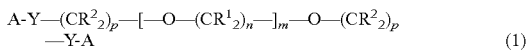

(1)

wherein:
m is an integer from 0 to 4;
each n is independently an integer from 1 to 4;
each p is independently an integer from 1 to 4;
each A is independently amino-substituted phenyl;
each Y is independently selected from O and S;
each $R^1$ is independently selected from hydrogen and $C_{1-3}$ alkyl; and
each $R^2$ is independently selected from hydrogen and $C_{1-3}$ alkyl.

In a ninth aspect of the present disclosure, sealed apertures that are sealed with a sealant comprising a composition comprising a flexible polyamine and/or a flexible amine-terminated adduct and an isocyanate-terminated prepolymer are provided.

In a tenth aspect of the present disclosure, methods of sealing an aperture are provided comprising applying a sealant comprising a composition comprising a flexible polyamine and/or a flexible amine-terminated adduct and an isocyanate-terminated prepolymer.

The present disclosure is also directed to methods for making flexible polyamines, flexible amine-terminated adducts, and compositions thereof, such as sealant compositions, including aerospace sealant compositions.

Those skilled in the art will understand that the drawings, described herein, are for illustration purposes only. The drawings are not intended to limit the scope of the present disclosure.

FIG. 1 shows an example of a reaction for preparing a 4,4'-methylene dicyclohexyl diisocyanate ($H_{12}$MDI)-terminated thiodiglycol polyformal-isocyanate prepolymer A dash ("—") that is not between two letters or symbols is used to indicate a point of bonding for a substituent or between two atoms. For example, —$CONH_2$ is bonded to another chemical moiety through the carbon atom.

"Activated ethylenically unsaturated isocyanate" refers to a compound comprising an ethylenically unsaturated group and an isocyanate group in which the double bond is electron deficient such that it is activated toward Michael addition, i.e., the double bond is a Michael acceptor.

"Aldehyde" refers to a compound of the formula CH(O)R where R is hydrogen or a hydrocarbon group such as an alkyl group, as defined herein. In certain embodiments, the aldehyde is $C_{1-10}$ aldehyde, $C_{1-6}$ aldehyde, $C_{1-4}$ aldehyde, $C_{1-3}$ aldehyde, and in certain embodiments, $C_{1-2}$ aldehyde. In certain embodiments, the aldehyde is formaldehyde. In certain embodiments of the aldehyde, R is selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl(—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. In certain embodiments, each aryl and/or arenediyl group(s) is $C_{6-12}$, $C_{6-10}$, and in certain embodiments, phenyl or benzenediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkoxy" refers to an —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl.

"Arenediyl" refers to diradical monocyclic or polycyclic aromatic group. Examples of arenediyl groups include benzene-diyl and naphthalene-diyl. In certain embodiments, the arenediyl group is $C_{6-12}$ arenediyl, $C_{6-10}$ arenediyl, $C_{6-9}$ arenediyl, and in certain embodiments, benzene-diyl.

"Aryl" refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered heterocycloalkyl ring containing one or more heteroatoms chosen from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexylene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, the aryl group can have from 6 to 20 carbon atoms, and in certain embodiments, from 6 to 12 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein. In certain embodiments, an aryl group is phenyl.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Cycloalkylalkyl" refers to an alkyl group in which one of the hydrogen atoms is replaced with a cycloalkyl group. In certain embodiments of the cycloalkylalkyl group, a hydrogen atom on the terminal carbon atom of an alkyl group is replaced with a cycloalkyl group. In certain embodiments of cycloalkylalkyl, the cycloalkyl group is a $C_{3-6}$ cycloalkyl group, in certain embodiments a $C_{5-6}$ cycloalkyl group, and in certain embodiments, a cyclopropyl, a cyclobutyl, a cyclopentyl, or a cyclohexyl group. In certain embodiments, the alkanediyl portion of a cycloalkylalkyl group may be, for example, $C_{1-10}$ alkanediyl, $C_{1-6}$ alkanediyl, $C_{1-4}$ alkanediyl, $C_{1-3}$ alkanediyl, propane-1,3-diyl, ethane-1,2-diyl, or methane-diyl. In certain embodiments, the cycloalkylalkyl group is $C_{4-16}$ cycloalkylalkyl, $C_{4-12}$ cycloalkylalkyl, $C_{4-10}$ cycloalkylalkyl, $C_{6-12}$ cycloalkylalkyl, or $C_{6-9}$ cycloalkylalkyl. For example, $C_{6-9}$ cycloalkylalkyl includes a $C_{1-3}$ alkyl group bonded to a cyclopentyl or a cyclohexyl group.

"Cycloalkylalkane" group refers to a saturated, branched or straight-chain, acyclic hydrocarbon group in which one of the hydrogen atoms is replaced with a cycloalkane group. In certain embodiments of the cycloalkylalkane group, a hydrogen atom on the terminal carbon atom of a linear alkane group is replaced with a cycloalkyl group. In certain embodiments the cycloalkyl group is a $C_{3-6}$ cycloalkyl group, in certain embodiments a $C_{5-6}$ cycloalkyl group, and in certain embodiments a cyclopropyl, a cyclobutyl, a cyclopentyl, or a cyclohexyl group. The alkane portion of a cycloalkylalkane group may be, for example, $C_{1-10}$ alkane, $C_{1-6}$ alkane, $C_{1-4}$ alkane, $C_{1-3}$ alkane, propane, ethane, or methane. In certain embodiments, a cycloalkylalkane group is $C_{4-16}$ cycloalkylalkane, $C_{4-12}$ cycloalkylalkane, $C_{4-10}$ cycloalkylalkane, $C_{6-12}$ cycloalkylalkane, or $C_{6-9}$ cycloalkylalkane. For example, $C_{6-9}$ cycloalkylalkane includes a $C_{1-3}$ alkyl group bonded to a cyclopentyl or a cyclohexyl group.

"Group derived from a diisocyanate" refers to a group in which one or both of the terminal isocyanate groups of a parent diisocyanate form a urethane (—O—C(O)—N(R)—), thiourethane (—S—C(O)—N(R)—), or urea linkage (—N(R)—C(O)—N(R)—). The group derived from a diisocyanate includes groups derived from aliphatic diisocyanates and groups derived from aromatic diisocyanates. In certain embodiments, the group derived from a diisocyanate is a group derived from an aliphatic diisocyanate, and in certain embodiments a group derived from a diisocyanate is a group derived from an aromatic diisocyanate. For example, a group derived from 2,6-diisocyanatotoluene has the structure:

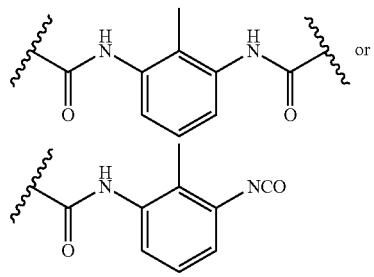

where the group is bonded to a —O—, —S—, or —NR— group, and results from the reaction of an isocyanate group with a hydroxyl group, a thiol group, or an amine group.

Examples of aliphatic diisocyanates include, 1,6-hexamethylene diisocyanate, 1,5-diisocyanato-2-methylpentane, methyl-2,6-diisocyanatohexanoate, bis(isocyanatomethyl) cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.] heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate ($H_{12}MDI$). Examples of aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Examples of aromatic diisocyanates in which the isocyanate groups are not bonded directly to the aromatic ring include, bis(isocyanatoethyl)benzene, α,α,α',α'-tetramethylxylene diisocyanate, 1,3-bis(1-isocyanato-1-methylethyl) benzene, bis(isocyanatobutyl)benzene, bis(isocyanatomethyl)naphthalene, bis(isocyanatomethyl)diphenyl ether, bis (isocyanatoethyl)phthalate, and 2,5-di(isocyanatomethyl) furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Examples of alicyclic diisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

"Group derived from an activated ethylenically unsaturated monoisocyanate" refers to a group in which the isocyanate group of a parent activated ethylenically unsaturated monoisocyanate forms a urethane, thiourethane or urea linkage and the activated ethylenically unsaturated group is bonded to another moiety or that is not bonded to another moiety. In certain embodiments, a group derived from an activated ethylenically unsaturated isocyanate refers to a group in which an isocyanate group of a parent activated ethylenically unsaturated monoisocyanate forms a urethane, thiourethane or urea linkage and the activated ethylenically unsaturated group is not bonded to another moiety. For example, a group derived from the activated ethylenically unsaturated monoisocyanate 2-isocyanatoethyl methacrylate can have the structure:

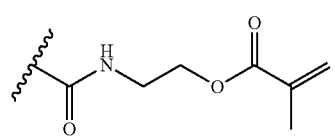 [SMILES: *C(=O)NCCOC(=O)C(=C)C]

where the carbonyl is bonded to —O—, —S—, or —NR— to form a urethane, thiourethane or urea group, respectively. In certain embodiments, a group derived from an ethylenically unsaturated isocyanate refers to a group in which an isocyanate group of a parent ethylenically unsaturated monoisocyanate forms a urethane, thiourethane or urea linkage and the ethylenically unsaturated group is bonded to another moiety. For example, in such embodiments, a group derived from the activated ethylenically unsaturated monoisocyanate 2-isocyanatoethyl methacrylate has the structure:

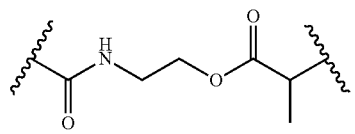 [SMILES: *C(=O)NCCOC(=O)C(*)C]

where the carbonyl is bonded to —O—, —S—, or —NR— to form a urethane, thiourethane or urea group, and the former vinyl group is bonded to another moiety.

Groups that are reactive with an epoxy group include amine groups. In such embodiments, a group V comprising a group that is reactive with an epoxy group can have the formula —V—NH$_2$; and a moiety resulting from the reaction of V with an epoxy group can have the formula —V—NH—CH$_2$—CH(OH)—.

"Heteroalkanediyl" refers to an alkanediyl group in which one or more of the carbon atoms are replaced with a heteroatom, such as N, O, S, or P. In certain embodiments of heteroalkanediyl, the heteroatom is selected from N and O.

"Heteroarenediyl" refers to an arenediyl group in which one or more of the carbon atoms are replaced with a heteroatom, such as N, O, S, or P. In certain embodiments of heteroarenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Heteroalkanearenediyl" refers to an alkanearenediyl group in which one or more of the carbon atoms are replaced with a heteroatom, such as N, O, S, or P. In certain embodiments of heteroalkanearenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Ketone" refers to a compound of the formula $CO(R)_2$, where each R is a hydrocarbon group. In certain embodiments of a ketone, each R is independently selected from $C_{1-6}$ alkyl, $C_{7-12}$ phenylalkyl, substituted $C_{7-12}$ phenylalkyl, $C_{6-12}$ cycloalkylalkyl, and substituted $C_{6-12}$ cycloalkylalkyl. In certain embodiments of the ketone, each R is independently selected from methyl, ethyl, and propyl. In certain embodiments, the ketone is selected from propan-2-one, butan-2-one, pentan-2-one, and pentan-3-one.

"Oxyalkanediyl" refers to an alkanediyl group in which one or more of the carbon atoms and certain atoms or groups bonded to the one or more carbon atom are replaced with an oxygen atom. In certain embodiments of oxyalkanediyl, the oxyen atoms will not be adjacent to other oxygen atoms. In certain embodiments, oxyalkanediyl is $C_{2-10}$ oxyalkanediyl, $C_{2-8}$ oxyalkanediyl, $C_{2-6}$ oxyalkanediyl, and in certain embodiments, $C_{2-4}$ oxyalkanediyl.

"Phenylalkyl" refers to an alkyl group in which one of the hydrogen atoms is replaced with a phenyl group. In certain embodiments of phenylalkyl, one of the hydrogen atoms of the terminal carbon atom of a linear alkyl group is replaced with a phenyl group. In certain embodiments, the phenylalkyl group is $C_{7-12}$ phenylalkyl, $C_{7-10}$ phenylalkyl, $C_{7-9}$ phenylalkyl, and in certain embodiments, benzyl.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner.

As indicated, certain embodiments provided by the present disclosure relate to flexible amine-terminated, sulfur-containing adducts. Sulfur-containing polymers include polythioethers, polydisulfides, and polymers containing both thioether and disulfide groups. Polythioether generally refers to a polymer containing at least two thioether groups, e.g., two —C—S—C— groups. Polydisulfide refers to a polymer containing at least two disulfide groups, e.g., two —C—S—S—C— groups. In addition to at least two thioether and/or disulfide groups, sulfur-containing polymers provided by the present disclosure may comprise at least two formal, acetal, and/or ketal groups, e.g., at least two —O—C(R)$_2$—O— groups, where each R is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$cycloalkyl, substituted $C_{3-12}$ cyclo alkyl, $C_{6-12}$ aryl, and substituted $C_{6-12}$ aryl.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is chosen from —OH, —NH$_2$, and $C_{1-3}$ alkyl.

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Reference is now made to certain embodiments of polymers, compositions, and methods. The disclosed embodiments are not intended to be limiting of the claims. To the contrary, the claims are intended to cover all alternatives, modifications, and equivalents.

In certain embodiments, flexible polyamines provided by the present disclosure have the structure of Formula (1):

$$A-Y-(CR^2{}_2)_p-[-O-(CR^1{}_2)_n-]_m-O-(CR^2{}_2)_p-Y-A \quad (1)$$

where:
  m is an integer from 0 to 4;
  each n is independently an integer from 1 to 4;
  each p is independently an integer from 1 to 4;
  each A is independently amino-substituted phenyl;
  each Y is independently selected from O and S;
  each $R^1$ is independently selected from hydrogen and $C_{1-3}$ alkyl; and
  each $R^2$ is independently selected from hydrogen and $C_{1-3}$ alkyl.

In certain embodiments of a polyamine of Formula (1), each $R^1$ is hydrogen and each $R^2$ is hydrogen.

In certain embodiments of a polyamine of Formula (1), m is selected from 0 and 1.

In certain embodiments of a polyamine of Formula (1), each n is 1, each n is 2, each n is 3, and in certain embodiments, each n is 4.

In certain embodiments of a polyamine of Formula (1), each p is 1, each p is 2, each p is 3, and in certain embodiments, each p is 4.

In certain embodiments of a polyamine of Formula (1), each Y is O.

In certain embodiments of a polyamine of Formula (1), each Y is S.

In certain embodiments of a polyamine of Formula (1), each A is the same.

In certain embodiments of a polyamine of Formula (1), each A is selected from 2-aminophenyl, 3-aminophenyl, and 4-aminophenyl.

In certain embodiments of a polyamine of Formula (1), each $R^1$ and $R^2$ is hydrogen; m is 0; p is 2; each Y is O; and each A is the same and is selected from 2-aminophenyl, 3-aminophenyl, and 4-aminophenyl. In certain embodiments of a polyamine of Formula (1), each $R^1$ and $R^2$ is hydrogen; m is 1; n is 1; p is 2; each Y is O; and each A is the same and is selected from 2-aminophenyl, 3-aminophenyl, and 4-aminophenyl. In certain embodiments of a polyamine of Formula (1), each $R^1$ and $R^2$ is hydrogen; m is 0; p is 2; each Y is S; and each A is the same and is selected from 2-aminophenyl, 3-aminophenyl, and 4-aminophenyl. In certain embodiments of a polyamine of Formula (1), each $R^1$ and $R^2$ is hydrogen; m is 1; n is 1; p is 2; each Y is S; and each A is the same and is selected from 2-aminophenyl, 3-aminophenyl, and 4-aminophenyl.

In certain embodiments, a difunctional flexible polyamine of Formula (1) is selected from 2,2'-(2,2'-methylenebis(oxy)bis(ethane-2,1-diyl)bis(sulfanediyl))dianiline, 4,4'-(2,2'-methylenebis(oxy)bis(ethane-2,1-diyl)bis(oxy))dianiline, 4,4'-(2,2'-methylenebis(oxy)bis(ethane-2,1-diyl)bis(sulfanediyl))dianiline, and 2,2'-(ethane-1,2-diylbis(sulfanediyl))dianiline, 2,2'-methylenebis(sulfanediyl)dianiline.

In certain embodiments, a flexible polyamine may comprise one or more polyamines of Formula (1).

Polyamines provided by the present disclosure may be prepared using methods known in the art such as disclosed in Canadian Patent No. 1082398.

In certain embodiments, polyamines provided by the present disclosure may be prepared by treating an aminothiophenol as 2-aminobenzenethiol, 3-aminobenzenethiol, or 4-aminobenzenethiol with an alkali base such as potassium hydroxide in an organic solvent to provide the corresponding alkali salt, followed by reaction at elevated temperature with a halogen-terminated compound of Formula (3):

$$X-(CR^2{}_2)_p-[-O-(CR^1{}_2)_n-]_m-O-(CR^2{}_2)_p-X \quad (3)$$

where X is a halogen selected from chloro, bromo, and iodo; and the variables $R^1$, $R^2$, n, m, and p are as defined for polyamines of Formula (1) to provide the corresponding difunctional flexible polyamine. In certain embodiments, a compound of Formula (3) is selected from bis-2-chloroethylformal, 1,2-diiodoethane, and dibromomethane.

In certain embodiments, flexible amine-terminated polyformal adducts provided by the present disclosure are selected from an adduct of Formula (4), an adduct of Formula (5), and a combination thereof:

$$R^5-R^3-(S)_u-R^3-[O-\underset{R^4\ R^4}{C}-O-R^3-(S)_u-R^3]_t-R^5 \quad (4)$$

$$\left(R^5-R^3-(S)_u-R^3-[O-\underset{R^4\ R^4}{C}-O-R^3-(S)_u-R^3]_t-O-\underset{R^4\ R^4}{C}-O\right)_z-B \quad (5)$$

wherein:
  each t is independently an integer selected from 1 to 50;
  each u is independently selected from 1 and 2;
  each $R^3$ is independently $C_{2-6}$ alkanediyl;
  each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl;
  B represents the core of a z-valent polyol $B(OH)_z$, wherein z is an integer from 3 to 6; and
  each $R^5$ is independently a group comprising F, wherein F is an amine-terminated group of Formula (1'):

$$A-Y-(CR^2{}_2)_p-[-O-(CR^1{}_2)_n-]_m-O-(CR^2{}_2)_p-Y-A'- \quad (1')$$

wherein:
  m is an integer from 0 to 4;
  each n is independently an integer from 1 to 4;
  each p is independently an integer from 1 to 4;
  A is amino-substituted phenyl;

-A'- is

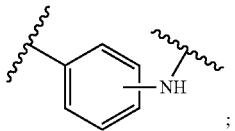

each Y is independently selected from O and S;
each $R^1$ is independently selected from hydrogen and $C_{1-3}$ alkyl; and
each $R^2$ is independently selected from hydrogen and $C_{1-3}$ alkyl.

In certain embodiments, amine-terminated polyformal adducts provided by the present disclosure comprise the reaction product of reactants comprising:
(a) a terminal-modified polyformal polymer comprising the reaction products of reactants comprising:
(i) a polyformal polyol selected from a polyol of Formula (6), a polyol of Formula (7), and a combination thereof:

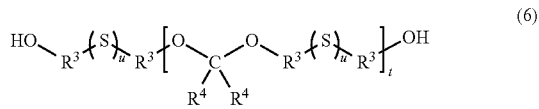

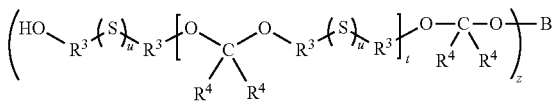

wherein:
each t is independently an integer selected from 1 to 50;
each u is independently selected from 1 and 2;
each $R^3$ is independently selected from $C_{2-6}$ alkanediyl;
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$cycloalkyl, substituted $C_{3-12}$ cycloalkyl, $C_{6-12}$ aryl, and substituted $C_{6-12}$ aryl; and
B represents the core of a z-valent polyol $B(OH)_z$, wherein z is an integer from 3 to 6; and
(ii) a compound comprising a terminal group selected from an ethylenically unsaturated group, an isocyanate group, and an epoxy group; and a group that is reactive with the terminal hydroxyl groups of the polyols of Formula (6) and Formula (7); and
(b) a polyamine of Formula (1):

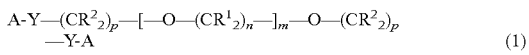

wherein:
m is an integer from 0 to 4;
each n is independently an integer from 1 to 4;
each p is independently an integer from 1 to 4;
each A is independently amino-substituted phenyl;
each Y is independently selected from O and S;
each $R^1$ is independently selected from hydrogen and $C_{1-3}$ alkyl; and
each $R^2$ is independently selected from hydrogen and $C_{1-3}$ alkyl.

Difunctional polyformal polymers are disclosed, for example, in U.S. patent application Ser. No. 13/050,988, and multifunctional polyformal polymers are disclosed, for example, in U.S. Provisional Application No. 61/453,978, filed on Mar. 18, 2011. Polyurea compositions comprising polyformal polymers are disclosed in U.S. application Ser. No. 13/051,002.

In certain embodiments of an adduct of Formula (4) and Formula (5), each $R^1$ is hydrogen and each $R^2$ is hydrogen.

In certain embodiments of an adduct of Formula (4) and Formula (5), m is selected from 0 and 1.

In certain embodiments of an adduct of Formula (4) and Formula (5), each n is 1, each n is 2, each n is 3, and in certain embodiments, each n is 4.

In certain embodiments of an adduct of Formula (4) and Formula (5), each p is 1, each p is 2, each p is 3, and in certain embodiments, each p is 4.

In certain embodiments of an adduct of Formula (4) and Formula (5), each Y is O.

In certain embodiments of an adduct of Formula (4) and Formula (5), each Y is S.

In certain embodiments of an adduct of Formula (4) and Formula (5), each A is the same.

In certain embodiments of an adduct of Formula (4) and Formula (5), each A is independently selected from 2-aminophenyl, 3-aminophenyl, and 4-aminophenyl.

In certain embodiments of an adduct of Formula (4) and Formula (5), each A is the same and is selected from 2-aminophenyl, 3-aminophenyl, and 4-aminophenyl.

In certain embodiments of an adduct of Formula (4) and Formula (5), each $R^1$ and $R^2$ is hydrogen; m is 0; p is 2; each Y is O; and each A is the same and is selected from 2-aminophenyl, 3-aminophenyl, and 4-aminophenyl. In certain embodiments of an adduct of Formula (4) and Formula (5), each $R^1$ and $R^2$ is hydrogen; m is 1; n is 1; p is 2; each Y is O; and each A is the same and is selected from 2-aminophenyl, 3-aminophenyl, and 4-aminophenyl. In certain embodiments of an adduct of Formula (4) and Formula (5), each $R^1$ and $R^2$ is hydrogen; m is 0; p is 2; each Y is S; and each A is the same and is selected from 2-aminophenyl, 3-aminophenyl, and 4-aminophenyl. In certain embodiments of an adduct of Formula (4) and Formula (5), each $R^1$ and $R^2$ is hydrogen; m is 1; n is 1; p is 2; each Y is S; and each A is the same and is selected from 2-aminophenyl, 3-aminophenyl, and 4-aminophenyl.

In certain embodiments of an adduct of Formula (4) and Formula (5), each A' is selected from N-yl-2-phenyl aniline, N-yl-3-phenyl aniline, and N-yl-4-phenyl aniline.

In certain embodiments of polyformal polymers of Formula (4), Formula (5), Formula (6), and Formula (7), each $R^3$ is independently selected from $C_{2-6}$ alkanediyl, $C_{2-4}$ alkanediyl, $C_{2-3}$ alkanediyl, and in certain embodiments, ethane-1,2-diyl. In certain embodiments of polyformal polymers of Formula (4), Formula (5), Formula (6), and Formula (7), each $R^3$ is ethane-1,2-diyl.

In certain embodiments of polyformal polymers of Formula (4), Formula (5), Formula (6), and Formula (7), each $R^4$ is independently selected from hydrogen, $C_{1-6}$ alkyl, $C_{1-4}$ alkyl, $C_{1-3}$ alkyl, and in certain embodiments, $C_{1-2}$ alkyl. In certain embodiments of polyformal polymers of Formula (4), Formula (5), Formula (6), and Formula (7), each $R^4$ is methyl, and in certain embodiments, ethyl. In certain embodiments of polyformal polymers of Formula (4), Formula (5), Formula (6), and Formula (7), each $R^4$ is hydrogen, and in certain embodiments, each $R^4$ is selected from hydrogen, methyl, and ethyl.

In certain embodiments of polyformal polymers of Formula (4), Formula (5), Formula (6), and Formula (7), each $R^3$ is the same and is selected from a $C_{2-3}$ alkanediyl such as ethane-1,2-diyl and propane-1,3-diyl; and each $R^4$ is the same and is selected from hydrogen and $C_{1-3}$ alkyl such as methyl, ethyl, and propyl. In certain embodiments of polyformal polymers of Formula (4), Formula (5), Formula (6), and Formula (7), each $R^4$ is hydrogen, and in certain embodiments, each $R^4$ is methyl. In certain embodiments of polyformal polymers of Formula (4), Formula (5), Formula (6), and Formula (7), each $R^3$ is ethane-1,2-diyl and each $R^4$ is hydrogen. In certain embodiments of polyformal polymers of Formula (4), Formula (5), Formula (6), and Formula (7), each $R^3$ is the same and is selected from ethane-1,2-diyl and propane-1,3-diyl; and each $R^4$ is independently selected from hydrogen, methyl, and ethyl.

In certain embodiments of polyformal polymers of Formula (4), Formula (5), Formula (6), and Formula (7), t is an integer selected from 1 to 50, an integer selected from 2 to 40, an integer selected from 4 to 30, and in certain embodiments, t is an integer selected from 7 to 30.

In certain embodiments of polyformal polymers of Formula (4), Formula (5), Formula (6), and Formula (7), each u is the same and is 1, and in certain embodiments, each u is the same and is 2.

In certain embodiments of polyformal polymers of Formula (5) and Formula (7) where z is 3, the parent polyol $B(OH)_z$ is a triol of Formula (8):

(8)

where each $R^6$ is independently $C_{1-6}$ alkanediyl, and in certain embodiments, a triol of Formula (9):

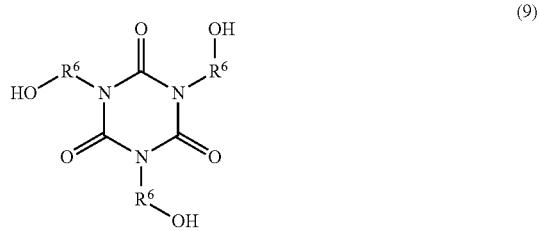

(9)

where each $R^6$ is independently $C_{1-6}$ alkanediyl. Accordingly, in these embodiments B has the structure:

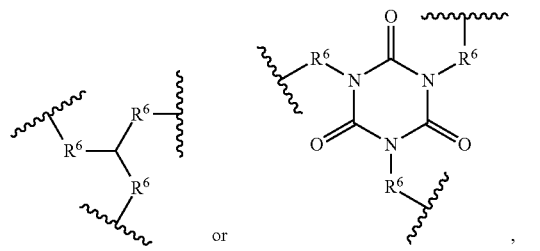

respectively, where each $R^6$ is independently $C_{1-6}$ alkanediyl. In certain embodiments of polyols of Formula (8) and Formula (9), each $R^6$ is the same and is $C_{1-6}$ alkanediyl, $C_{1-4}$ alkanediyl, and in certain embodiments, $C_{1-2}$ alkanediyl.

In certain embodiments of $B(OH)_z$, z is 3, z is 4, z is 5, and in certain embodiments, z is 6. A z-valent polyol $B(OH)_z$ may comprise one or more polyols having the same valency or may be a combination of polyols having different valencies.

In certain embodiments, a polyformal diol of Formula (6) comprises the reaction products of a sulfur-containing diol; and a reactant selected from an aldehyde, a ketone, and a combination thereof. In certain embodiments of the reaction, the sulfur-containing diol comprises a diol of Formula (10):

(10)

where u is selected from 1 and 2; and each $R^3$ is independently selected from $C_{2-6}$ alkanediyl. In certain embodiments of a sulfur-containing diol, u is 1 and in certain embodiments u is 2. In certain embodiments of a sulfur-containing diol, each $R^3$ is the same and in certain embodiments, each $R^3$ is different. In certain embodiments, each $R^3$ is selected from $C_{2-5}$ alkanediyl, $C_{2-4}$ alkanediyl, $C_{2-3}$ alkanediyl, and in certain embodiments, each $R^3$ is ethane-1,2-diyl. In certain embodiments of the reaction, the sulfur-containing diol comprises a sulfur-containing diol selected from 2,2'-thiodiethanol, 3,3'-thiobis(propan-1-ol), 4,4'-thiobis(butan-1-ol), and a combination of any of the foregoing. In certain embodiments of the reaction, the sulfur-containing diol comprises 2,2'-thiodiethanol.

In certain embodiments of a reaction to form a polyformal diol of Formula (6), a sulfur-containing diol of Formula (10) comprises a single type of sulfur-containing diol, and in certain embodiments, comprises a mixture of sulfur-containing diols. A mixture of sulfur-containing diols may comprise from 5 mol % to 95 mol % of one or more thioethers (u is 1) and from 95 mol % to 5 mol % of one or more disulfides (u is 2). In certain embodiments, a mixture of sulfur-containing diols comprises 50 mol % of one or more thioethers and 50 mol % of one or more disulfides. In certain embodiments, a mixture of sulfur-containing diols comprises from 0 mol % to 30 mol % of one or more disulfides, and from 100 mol % to 70 mol % of one or more thioethers.

In certain embodiments of a reaction to form a polyformal diol of Formula (6), a reactant is an aldehyde. In certain embodiments in which a reactant is an aldehyde, the aldehyde comprises a $C_{1-6}$ aldehyde, a $C_{1-4}$ aldehyde, a $C_{1-3}$ aldehyde, and in certain embodiments, a $C_{1-2}$ aldehyde. In certain embodiments, the aldehyde is formaldehyde. In certain embodiments in which a reactant is formaldehyde, the formaldehyde is provided as paraformaldehyde.

In certain embodiments of a reaction to form a polyformal diol of Formula (6), a reactant is a ketone. In certain embodiments in which a reactant is a ketone, the ketone has the formula $C(O)R_2$ where each R is independently selected from $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. In certain embodiments of a ketone, each R is independently selected from methyl, ethyl, and propyl. In certain embodiments, a ketone is selected from propan-2-one, butan-2-one, pentan-2-one, and pentan-3-one.

In certain embodiments, a polyformal diol of Formula (6) comprises the reaction products of reactants comprising 2,2'- thiodiethanol and formaldehyde, and is referred to herein as thiodiglycol polythioether or thiodiglycol polyformal.

The reaction used to prepare a polyformal diol of Formula (6) may take place in the presence of an acidic catalyst, such as sulfuric acid, sulfonic acid, or a combination thereof. In certain embodiments, a sulfonic acid may be used. Examples of sulfonic acids include alkyl sulfonic acids such as methane sulfonic acid, ethane sulfonic acid tert-butane sulfonic acid, 2-propane sulfonic acid, and cyclohexyl sulfonic acid; alkene sulfonic acids such as α-olefin sulfonic acid, dimerized α-olefin sulfonic acid, and 2-hexene sulfonic acid; aromatic sulfonic acids such as para-toluene sulfonic acids, benzene sulfonic acid, and naphthalene sulfonic acid; and polymer-supported sulfonic acids such as Amberlyst™ sulfonic acid catalysts available from Dow Chemical.

In certain embodiments, polyformal diols of Formula (6) have a hydroxyl number from 10 to 100, from 20 to 80, from 20 to 60, from 20 to 50, and in certain embodiments, from 20 to 40. The hydroxyl number is the hydroxyl content of the sulfur-containing diol, and may be determined, for example, by acetylating the hydroxyl groups and titrating the resultant acid against potassium hydroxide. The hydroxyl number is the weight of potassium hydroxide in milligrams that will neutralize the acid from one gram of the sulfur-containing polymer.

In certain embodiments, polyformal diols of Formula (6) has a number average molecular weight from 200 to 6,000 Daltons, from 500 to 5,000 Daltons, from 1,000 to 5,000 Daltons, from 1,500 to 4,000 Daltons, and in certain embodiments, from 2,000 to 3,600 Daltons.

Multifunctional polyformal polyols of Formula (7) may be prepared by reacting a sulfur-containing diol such as a diol of Formula (10); a reactant selected from an aldehyde, a ketone, and a combination thereof; and a multifunctional z-valent polyol $B(OH)_z$, wherein z is an integer from 3 to 6.

In certain embodiments, polyformal polyols of Formula (7) contain at least three hydroxyl groups per polyol molecule. For example, a polyformal polyol of Formula (7) may contain from three to ten hydroxyl groups per polyol molecule, from three to eight hydroxyl groups per polyol molecule, from three to six hydroxyl groups per polyol molecule, and in certain embodiments, from three to four hydroxyl groups per polyol molecule. In certain embodiments, a polyformal polyol of Formula (7) contains four hydroxyl groups per polyol molecule, and in certain embodiments, a polyformal polyol of Formula (7) contains three hydroxyl groups per polyol molecule. The polyol may be a single type of polyol or may be a mixture of different polyols having the same or different number of hydroxyl groups per molecule.

In certain embodiments of reactants (a)(i) above, polyols of Formula (6) and Formula (7) comprise the reaction products of reactants comprising a polyformal diol; a polyol containing at least three (3) hydroxyl groups per polyol molecule; and a reactant selected from an aldehyde, a ketone, and a combination thereof. The reactants may comprise one or more types of polyformal diol, one or more types of polyol, and/or one or more types of aldehyde and/or ketone.

In certain embodiments, a polyformal diol comprises a diol of Formula (10) where each $R^3$ is independently selected from $C_{2-6}$ alkanediyl. In certain embodiments, a polyformal diol comprises a polyformal diol selected from 2,2'-thiodiethanol, 3,3'-thiobis(propan-1-ol), 4,4'-thiobis(butan-1-ol), and a combination of any of the foregoing. In certain embodiments of the reaction, the polyformal diol comprises 2,2'-thiodiethanol.

In certain embodiments of a reaction to from a polyformal diol of Formula (7), a z-valent polyol has the formula $B(OH)_z$, where z is an integer from 3 to 6, and B represents the core of the z-valent polyol. In certain embodiments, a polyol comprises a triol (z is 3) of Formula (8):

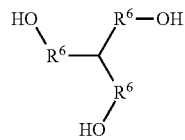

where each $R^6$ is independently $C_{1-6}$ alkanediyl, and in certain embodiments, a triol of Formula (9):

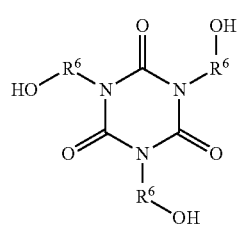

where each $R^6$ is independently $C_{1-6}$ alkanediyl. In certain embodiments of a polyol of Formula (8) and Formula (9), each $R^6$ may be independently selected from $C_{1-4}$ alkanediyl, and in certain embodiments, from $C_{1-3}$ alkanediyl. In certain embodiments of a trivalent polylol of Formula (8) and Formula (9), each $R^6$ may be the same, and in certain embodiments, each $R^6$ may be different. In certain embodiments of a trivalent polyol of Formula (8) and Formula (9), each $R^6$ is selected from methanediyl, ethane-1,2-diyl, propane-1,3-diyl, and in certain embodiments, butane-1,4-diyl.

In certain embodiments of reactions comprising polyols of Formula (6) and Formula (7), the reactant is an aldehyde. In certain embodiments in which the reactant is an aldehyde, the aldehyde comprises a $C_{1-6}$ aldehyde, a $C_{1-4}$ aldehyde, a $C_{1-3}$ aldehyde, and in certain embodiments, a $C_{1-2}$ aldehyde. In certain embodiments, the aldehyde comprises an alkyl and is selected from acetaldehyde, propionaldehyde, isobutyraldehyde, and butyraldehyde. In certain embodiments, the aldehyde is formaldehyde. In certain embodiments in which the reactant is formaldehyde, the formaldehyde is provided as paraformaldehyde.

In certain embodiments of a reaction to form polyformal polyols of Formula (6) and Formula (7), the reactant is a ketone. In certain embodiments in which the reactant is a ketone, the ketone has the formula $C(O)R_2$ where each R is independently selected from $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$cycloalkyl, substituted $C_{3-12}$ cycloalkyl, $C_{6-12}$ aryl, and substituted $C_{6-12}$ aryl. In certain embodiments of a ketone, each R is independently selected from methyl, ethyl, and propyl. In certain embodiments, a ketone is selected from propan-2-one, butan-2-one, pentan-2-one, pentan-3-one, and 3-methylbutan-2-one.

In certain embodiments of a reaction to form a polyformal polyols of Formula (6) and Formula (7), a polyol comprises the reaction product of reactants comprising 2,2'-thiodiethanol, a polyol, and formaldehyde. In certain embodiments, a polyformal polyol comprises the reaction product of reactants comprising 2,2'-thiodiethanol, a triol, and formaldehyde. In certain embodiments, a polyformal polyol provided by the present disclosure comprises the reaction product of reactants comprising 2,2'-thiodiethanol, formaldehyde, and a triol of Formula (8). In certain embodiments, a polyformal polyol provided by the present disclosure comprises the reaction product of reactants comprising 2,2'-thiodiethanol, formaldehyde, and a triol of Formula (9).

In certain embodiments of reactants (a)(i), a polyformal diol comprises a single type of polyformal diol, and in certain embodiments, comprises a combination of polyformal diols.

In embodiments in which the one or more polyols used to form polyformal polyols provided by the present disclosure have the same number of hydroxyl groups, the polyformal polyol will have a hydroxyl functionality approximately equivalent to that of the one or more polyols. For example, when a polyol having a hydroxyl functionality of three or a combination of polyols in which each of the polyols in the combination has a hydroxyl functionality of three is used to prepare a polyformal polyol, the polyformal polyol will have a hydroxyl functionality of three. In certain embodiments, a polyformal polyol may have an average hydroxyl functionality of three, four, five, and in certain embodiments, six.

When polyols having different hydroxyl functionalities are used to prepare polyformal polyols, the polyformal polyols can exhibit a range of functionalities. For example, polyformal polyols provided by the present disclosure may have an average hydroxyl functionality from 3 to 12, from 3 to 9, from 3 to 6, from 3 to 4, and in certain embodiments, from 3.1 to 3.5. In certain embodiments, a polyformal polyol having an average hydroxyl functionality from three to four may be prepared by reacting a combination of one or more polyols having a hydroxyl functionality of three and one or more polyols having a hydroxyl functionality of four.

In certain embodiments, polyformal polyols provided by the present disclosure have a hydroxyl number from 10 to 100, from 20 to 80, from 20 to 60, from 20 to 50, and in certain embodiments, from 20 to 40. The hydroxyl number is the hydroxyl content of the polyformal polyol, and may be determined, for example, by acetylating the hydroxyl groups and titrating the resultant acid against potassium hydroxide. The hydroxyl number is the weight of potassium hydroxide in milligrams that will neutralize the acid from one gram of the polyformal polyol.

In certain embodiments, polyformal polyols provided by the present disclosure have a number average molecular weight from 200 to 6,000 Daltons, from 500 to 5,000 Daltons, from 1,000 to 4,000 Daltons, from 1,500 to 3,500 Daltons, and in certain embodiments, from 2,000 Daltons to 3,200 Daltons.

Terminal-modified polyformal polymers comprising reaction products of reactants comprising (a)(i) and (a)(ii), above, comprise a terminal-modified polyformal polymer of Formula (11), a terminal-modified polyformal polymer of Formula (12), or a combination thereof:

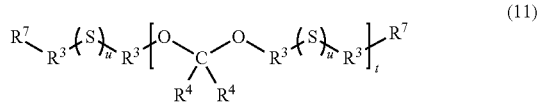

(11)

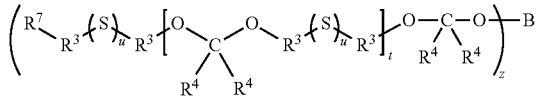

(12)

where u, t, z, $R^3$, $R^4$, and B are as defined for any of Formula (4), Formula (5), Formula (6), and Formula (7), and each $R^7$ is —$OR^{7'}$ wherein $R^{7'}$ is derived from a compound comprising a terminal group that is reactive with an amine group, such as an ethylenically unsaturated group, an isocyanate group, of an epoxy group; and a group that is reactive with the terminal hydroxyl groups of the polyformal polyols of Formula (6) and Formula (7).

In certain embodiments of terminal-modified, sulfur-containing polymers of Formula (11) and Formula (12), $R^7$ and $R^{7'}$ comprise an ethylenically unsaturated terminal group, which may be activated or unactivated. In certain embodiments, $R^7$ and $R^{7'}$ comprise an activated ethylenically unsaturated terminal group, and $R^{7'}$ is derived from a compound having an activated ethylenically unsaturated terminal group and a group that is reactive with a hydroxyl group such as an activated ethylenically unsaturated monoisocyanate. In certain embodiments, $R^7$ and $R^{7'}$ comprise an unactivated ethylenically unsaturated terminal group, and $R^{7'}$ is derived from a compound having an unactivated ethylenically unsaturated terminal group and a group that is reactive with a hydroxyl group, such as an ethylenically unsaturated alcohol.

Activated ethylenically unsaturated isocyanates include activated ethylenically unsaturated monoisocyanates including such as activated ethylenically unsaturated aromatic monoisocyanates and activated ethylenically unsaturated aliphatic monoisocyanates.

Examples of activated ethylenically unsaturated monoisocyanates include vinyl isocyanate, allyl isocyanate, 3-isocyanato-2-methyl-2-propene, methacryloyl isocyanate, isocyanatoethyl methacrylate, vinyl-benzyl isocyanate, 3-isocyanato-1-butene, 3-isocyanato-3-methyl-1-butene, 4-isocyanato-2-methyl-1-butene, 4-isocyanato-3,3-dimethyl-1-butene, 4-isocyanato-4-methyl-1-pentene, and 5-isocyanato-1-pentene, 2-isocyanatoethyl methacrylate, and dimethyl-meta-isopropenylbenzyl isocyanate (TMI). In certain embodiments, an activated ethylenically unsaturated monoisocyanate is selected from vinyl isocyanate, allyl isocyanate, and methyacryloyl isocyanate. In certain embodiments, an ethylenically unsaturated aliphatic isocyanate is $C_{2-10}$ alkenyl isocyanate, $C_{2-8}$ alkenyl isocyanate, $C_{2-6}$ alkenyl isocyanate, and in certain embodiments, $C_{2-3}$ alkenyl isocyanate.

Examples of ethylenically unsaturated alcohols include, for example, allyl alcohol, 3-buten-1-ol, 3-buten-2-ol, ethylene glycol monovinyl ether, ethylene glycol monoallyl ether, diethylene glycol monoallyl ether, glycerin monoallyl ether, trimethylolethane monoallyl ether, trimethylolpropane monoallyl ether, polyethylene glycol monoallyl ether, polypropylene glycol monoallyl ether, 1-vinylcyclobutanol, 2-vinylcyclobutanol, 3-vinylcyclobutanol, vinylphenol, 2-allyl phenol, 4-allylphenol, 4-allyl-2-methoxyphenol, 4-allyl-2,6-dimethoxyphenol, 4-(2-propenyl)-1,2-benzenediol, and 4-(2,4-dihydroxyphenyl)-3-buten-2-one. In certain embodiments, an ethylenically unsaturated alcohol is selected from allyl alcohol, ethylene glycol monoallyl ether, 2-allylphenol, and 4-allylphenol.

In certain embodiments, $R^{7'}$ is derived from an activated ethylenically unsaturated compound selected from 3-isopropenyl-α,α-dimethylbenzyl isocyanate (CAS 2094-99-7) and 2-isocyanatoethyl methacrylate.

In certain embodiments of a polymer of Formula (11) and Formula (12), each $R^7$ is a group comprising an activated ethylenically unsaturated terminal group such as a group selected from Formula (a), Formula (b), Formula (c), Formula (d), and Formula (e):

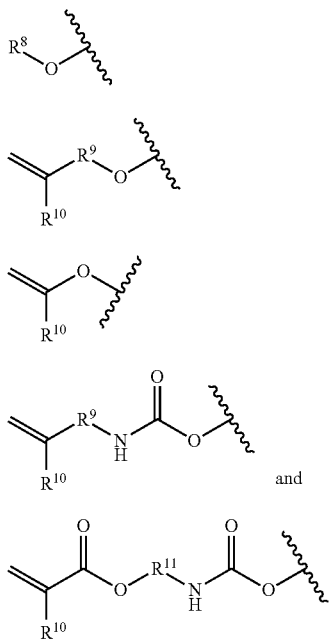

(a)

(b)

(c)

(d) and (e)

where each $R^8$ is a moiety derived from an ethylenically unsaturated monoisocyanate; each $R^9$ is independently selected from $C_{2-6}$ alkanediyl and $C_{2-6}$ heteroalkanediyl; each $R^{10}$ is independently selected from hydrogen, $C_{1-6}$ alkyl, and phenyl; and each $R^{11}$ is independently selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

In certain embodiments, each $R^8$ is derived from an ethylenically unsaturated aliphatic monoisocyanate, an ethylenically unsaturated alicyclic monoisocyanate, and in certain embodiments, an ethylenically unsaturated aromatic monoisocyanate. In certain embodiments, the ethylenically unsaturated aromatic monoisocyanate is 2-isocyanatoethyl methacrylate.

In certain embodiments of Formula (b) and Formula (d), each $R^9$ is independently selected from $C_{2-4}$ alkanediyl, $C_{2-3}$ alkanediyl, and in certain embodiments is selected from ethane-1,2-diyl, propane-1,3-diyl, propane-1,2-diyl, and propane-1,1-diyl. In certain embodiments of Formula (b) and Formula (d), each $R^7$ is independently selected from ethane-1,2-diyl and propane-1,3-diyl.

In certain embodiments of Formula (b), Formula (c), Formula (d), and Formula (e), each $R^{10}$ is independently selected from hydrogen, methyl, ethyl, isopropyl, and n-propyl.

In certain embodiments of Formula (e), each $R^{11}$ is independently selected from $C_{2-6}$ alkanediyl, $C_{6-12}$ arenediyl, substituted $C_{6-12}$ arenediyl, $C_{3-12}$ cycloalkanediyl, substituted $C_{3-12}$ cycloalkanediyl, $C_{7-18}$ alkanearenediyl, substituted $C_{7-18}$ alkanearenediyl, $C_{4-18}$ alkanecycloalkanediyl, and substituted $C_{4-18}$ alkanecycloalkanediyl. In certain embodiments of Formula (e), each $R^{11}$ is the same and is selected from methane-diyl, ethane-1,2-diyl, and propane-1,2-diyl. In certain embodiments of Formula (e), each $R^{11}$ is $C_{2-5}$ alkanediyl, $C_{2-4}$ alkanediyl, $C_{2-3}$ alkanediyl, and in certain embodiments, ethane-1,2-diyl.

In certain embodiments of Formula (11) and Formula (12), $R^7$ and $R^{7'}$ comprise a terminal epoxy group and $R^{7'}$ is derived from a compound comprising a terminal epoxy group and a group that is reactive with a hydroxy group, For example, in certain embodiments, $R^{7'}$ is derived from a compound selected from $C_{1-6}$ epoxy alkanol, $C_{1-6}$ epoxy haloalkane, and a combination thereof. Examples of suitable $C_{1-6}$ alkanol epoxides include oxirane-2-ol, oxirane-2-ylmethanol, and 2-(oxirane-2-yl)ethanol. Examples of suitable $C_{1-6}$ epoxy haloalkanes include, for example, 2-(chloromethyl)oxirane and 2-(2-chloroethyl)oxirane.

In certain embodiments of a polymer of Formula (11) and Formula (12), each $R^7$ is a group comprising an epoxy-terminated group such as a group of Formula (f):

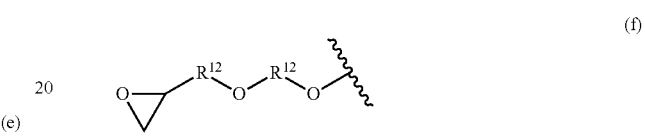

(f)

where each $R^{12}$ is independently $C_{1-6}$ alkanediyl.

In certain embodiments of Formula (f), each $R^{12}$ is independently selected from methanediyl, ethane-1,2-diyl, and propane-1,3-diyl. In certain embodiments, each $R^{12}$ is the same and is selected from methanediyl, ethane-1,2-diyl, and propane-1,3-diyl.

In certain embodiments of Formula (11) and Formula (12), $R^7$ and $R^{7'}$ comprise a terminal isocyanate group and $R^{7'}$ is derived from a compound comprising a terminal isocyanate group and a group that is reactive with the hydroxyl groups of the polyformal polyols of Formula (6) or Formula (7). In certain embodiments, $R^{7'}$ is derived from a diisocyanate.

An isocyanate-terminated polyformal of Formula (11) and Formula (12) may be formed by reacting a diisocyanate with a polyformal polyol. In certain embodiments, the molar ratio of the diisocyanate to the polyformal polyol is greater than 2 to 1, greater than 2.3 to 1, greater than 2.6 to 1, and in certain embodiments, greater than 3 to 1.

Examples of suitable diisocyanates include, for example, 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, and 4,4-methylene dicyclohexyl diisocyanate ($H_{12}MDI$). Other examples of suitable diisocyanates are disclosed herein.

In certain embodiments of a sulfur-containing polymer of Formula (11) and Formula (12), each $R^7$ is selected from an isocyanate-terminated group of Formula (g):

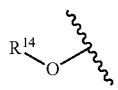

(g)

where each $R^{14}$ is a group derived from a diisocyanate.

In certain embodiments of Formula (g), each $R^{14}$ is a group derived from TDI, Isonate™ 143L (polycarbodiimide-modified diphenylmethane diisocyanate), Desmodur® N3400 (1,3-diazetidine-2,4-dione, 1,3-bis(6-isocyanatohexyl)-), Desmodur® I (isophorone diisocyanate, IPDI), or Desmodur® W ($H_{12}$MDI). In certain embodiments, $R^{14}$ may be derived from any suitable diisocyanate including any of the diisocyanates disclosed herein.

Terminal-modified sulfur containing polymers of Formula (11) and Formula (12) may be reacted with a polyamine of Formula (1) to provide a flexible amine-terminated adduct of Formula (4) and Formula (5).

In certain embodiments, $R^5$ is —O—$R^{5'}$—F wherein —$R^{5'}$ is a moiety derived from a compound comprising a group that is reactive with a hydroxyl group and a terminal group that is reactive with an amine group. Groups that are reactive with hydroxyl groups include, for example, isocyanate groups, epoxy groups, hydroxyl groups, and ethylenically unsaturated groups. Groups that are reactive with amine groups include, for example, ethylenically unsaturated groups, epoxy groups, and isocyanate groups. Compounds comprising a group that is reactive with a hydroxyl group and a terminal group that is reactive with an amine group include, for example, ethylenically unsaturated monoisocyanates, ethylenically unsaturated alcohols, epoxy alkanols, epoxy haloalkanes, and diisocyanates. In certain embodiments, $R^{5'}$ is derived from the reaction of a compound comprising a group that is reactive with a hydroxyl group of a polyol of Formula (6) or Formula (7) and a terminal group that is reactive with an amine group of a polyamine of Formula (1). Stated differently, $R^{5'}$ is a moiety derived from the reaction of $R^{7'}$ with a flexible polyamine of Formula (1), and $R^5$ is a group derived from the reaction of $R^7$ with a flexible polyamine of Formula (1).

In certain embodiments of an amine-terminated polyformal adduct of Formula (4) and Formula (5), each $R^5$ is derived from an ethylenically unsaturated group and is independently selected from a group of Formula (a'), Formula (b'), Formula (c'), Formula (d')', and Formula (e'):

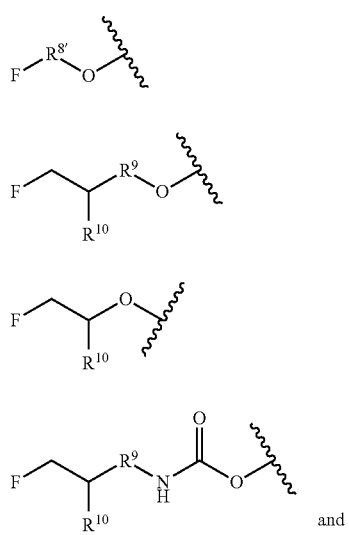

-continued

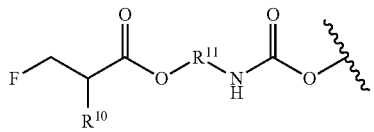

where each $R^{8'}$ is a moiety derived from an ethylenically unsaturated monoisocyanate; each $R^9$ is independently selected from $C_{2-6}$ alkanediyl and $C_{2-6}$ heteroalkanediyl; each $R^{10}$ is independently selected from hydrogen, $C_{1-6}$ alkyl, and phenyl; and each $R^{11}$ is independently selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

In certain embodiments of an amine-terminated polyformal adduct of Formula (4) and Formula (5), each $R^5$ is derived from an epoxy-terminated group and is a group of Formula (f'):

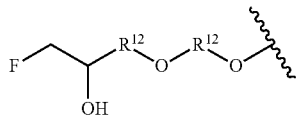

where each $R^{12}$ is independently $C_{1-6}$ alkanediyl.

In certain embodiments of Formula (f'), each $R^{12}$ is independently selected from methanediyl, ethane-1,2-diyl, and propane-1,3-diyl. In certain embodiments, each $R^{12}$ is the same and is selected from methanediyl, ethane-1,2-diyl, and propane-1,3-diyl.

In certain embodiments of an amine-terminated, sulfur-containing adduct of Formula (4) and Formula (5), each $R^5$ is derived from the reaction of an isocyanate-terminated group and a polyamine of Formula (1) and is a group of Formula (g'):

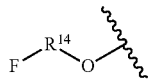

where each $R^{14}$ is a group derived from a diisocyanate.

Terminal-modified difunctional and multifunctional sulfur-containing polymers provided by the present disclosure and precursors thereof may be prepared by a number of methods known to those skilled in the art, including those described in the examples herein. For example, to obtain terminal-modified sulfur-containing polymers of Formula (11) and Formula (12), a sulfur-containing polyol of Formula (6) and Formula (7) may be reacted with a compound having a group that is reactive with the terminal hydroxyl groups of the polyol and having an appropriate terminal group such as an ethylenically unsaturated group, an isocyanate group, or an epoxy group.

For example, to obtain an activated ethylenically unsaturated-terminated sulfur-containing polymer of Formula (11) and Formula (12), a sulfur-containing polymer of Formula (6)

and Formula (7) may be reacted with a compound containing a terminal activated ethylenically unsaturated group and an isocyanate group such as TMI, 2-isocyanatoethyl methacrylate, or allyl isocyanate, in the presence of dibutyltin dilaurate catalyst at 76° C. As a further example, a sulfur-containing polymer of Formula (6) and Formula (7) may be reacted with an alkene-ol such as 3-butene-1-ol and an aldehyde such as formaldehyde in the presence of a sulfonic acid (e.g., 4.7 meq/g H+) such as Amberlyst™ 15 in an organic solvent such as toluene to provide a activated ethylenically unsaturated-terminated sulfur-containing polymer of Formula (11) and Formula (12).

Epoxy-terminated sulfur-containing polymers of Formula (11) and Formula (12) may be prepared, for example, by reacting a sulfur-containing polymer of Formula (6) and Formula (7) in the presence of a monoepoxide such as epichlorohydrin to provide the corresponding epoxy-terminated sulfur-containing polymer of Formula (11) and Formula (12).

Isocyanate-terminated sulfur-containing polymers of Formula (11) and Formula (12) may be prepared, for example, by reacting a sulfur-containing polymer of Formula (6) and Formula (7) with a diisocyanate such as TDI, Isontate™ 143L (polycarbodiimide-modified diphenylmethane diisocyanate), Desmodur® N3400 (1,3-diazetidine-2,4-dione, 1,3-bis(6-isocyanatohexyl)-), Desmodur® I (isophorone diisocyanate, IPDI), or Desmodur® W ($H_{12}MDI$) optionally in the presence of a catalyst such as dibutyltin dilaurate at a temperature from 70° C. to 80° C. Isocyanate-terminated sulfur-containing polymers may be used as intermediates in the synthesis of other terminal-modified sulfur-containing polymers such as certain amine-terminated and thiol-terminated sulfur-containing polymers provided by the present disclosure.

The reaction of a flexible polyamine of Formula (1) and a terminal-modified polyformal polymer of Formula (11) and/or (12) provides flexible amine-terminated polyformal adducts of Formula (4) and/or Formula (5).

In certain embodiments, amine-terminated polyformal adducts of Formula (4) and/or Formula (5) may be prepared, for example, by reacting a polyformal polymer Formula (11) and/or Formula (12) comprising an activated ethylenically unsaturated terminal group with a flexible polyamine of Formula (1), optionally in the presence of a catalyst such as 1,8-diazabicyclo[5.4.0]undec-7-ene (DBU) in an organic solvent to provide the corresponding amine-terminated polyformal adduct of Formula (4) and Formula (5).

Alternatively, amine-terminated polyformal adducts of Formula (4) and/or Formula (5) may be obtained by reacting an isocyanate-terminated polyformal polymer of Formula (11) and/or Formula (12) with a flexible polyamine of Formula (1) to provide the corresponding amine-terminated polyformal adduct of Formula (4) and/or Formula (5).

Amine-terminated polyformal adduct of Formula (4) and/or Formula (5) may also be obtained by reacting an epoxy-terminated polyformal polymer of Formula (11) and/or Formula (12) with a polyamine of Formula (1) to provide the corresponding amine-terminated polyformal adduct of Formula (4) and/or Formula (5).

In certain embodiments, amine-terminated polyformal adducts provided by the present disclosure such as compounds of Formula (4) and Formula (5) are liquid at room temperature. Moreover, in certain embodiments, the amine-terminated polyformal adducts have a viscosity, at 100% solids, of no more than about 500 poise, such as from about 10 to about 300 poise and in certain embodiments about 100 to about 200 poise, at a temperature of about 25° C. and a pressure of about 760 mm Hg determined according to ASTM D-2849 §79-90 using a Brookfield CAP 2000 viscometer. In certain embodiments, the $T_g$ (glass transition temperature) of amine-terminated polyformal adducts provided by the present disclosure is not higher than about −40° C., and in certain embodiments, is not higher than about −50° C.

In certain embodiments, an amine-terminated polythioether adduct is selected from an adduct of Formula (13), an adduct of Formula (14), and a combination thereof:

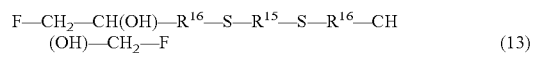

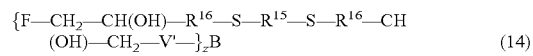

wherein:
each $R^{15}$ is independently selected from $C_{2-10}$ alkanediyl, $C_{2-10}$ oxyalkanediyl, $C_{6-8}$ cycloalkanediyl, $C_{6-10}$ alkanecycloalkanediyl, and $—[—(CHR^{17})_s—X—]_q—(CHR^{17})_r—$; wherein
each $R^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10;
each $R^{16}$ is independently selected from $C_{3-20}$ alkanediyl and $C_{3-20}$ oxyalkanediyl;
B represents the core of a z-valent polyfunctionalizing agent $B(V)_z$, wherein:
z is an integer from 3 to 6; and
each V comprises a group that is reactive with an epoxy group; and
each V' comprises a moiety resulting from the reaction of V with an epoxy group; and
each F is independently an amine-terminated group of Formula (1'):

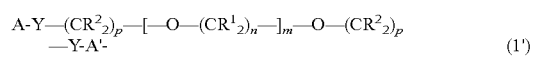

wherein:
m is an integer from 0 to 4;
each n is independently an integer from 1 to 4;
each p is independently an integer from 1 to 4;
A is amino-substituted phenyl;
-A'- is

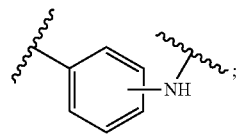

each Y is independently selected from O and S;
each $R^1$ is independently selected from hydrogen and $C_{1-3}$ alkyl; and
each $R^2$ is independently selected from hydrogen and $C_{1-3}$ alkyl.

In certain embodiments, an amine-terminated polythioether adduct comprises the reaction products of reactants comprising:
(a) an epoxy-terminated polythioether selected from a polythioether of Formula (15), a polythioether of Formula (16), and a combination thereof:

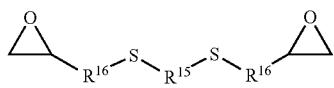

(15)

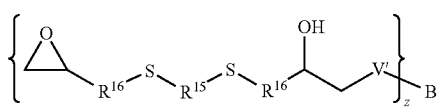

(16)

wherein:
each $R^{15}$ is independently selected from $C_{2-10}$ alkanediyl, $C_{2-10}$ oxyalkanediyl, $C_{6-8}$ cycloalkanediyl, $C_{6-10}$ alkanecycloalkanediyl, $C_{5-8}$ heterocycloalkanediyl, and $-[-(CHR^{17})_s-X-]_q-(CHR^{17})_r-$; wherein
each $R^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10; and
each $R^{16}$ is independently selected from $C_{3-20}$ alkanediyl and $C_{3-20}$ oxyalkanediyl;
B represents the core of a z-valent polyfunctionalizing agent $B(V)_z$, wherein:
z is an integer from 3 to 6; and
V comprises a group that is reactive with an epoxy group; and
V' comprises a moiety resulting from the reaction of V with an epoxy group; and
(b) a polyamine of Formula (1):

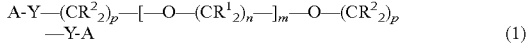

(1)

wherein:
m is an integer from 0 to 4;
each n is independently an integer from 1 to 4;
each p is independently an integer from 1 to 4;
each A is independently amino-substituted phenyl;
each Y is independently selected from O and S;
each $R^1$ is independently selected from hydrogen and $C_{1-3}$ alkyl; and
each $R^2$ is independently selected from hydrogen and $C_{1-3}$ alkyl.

In certain embodiments of polythioethers of Formula (13), Formula (14), Formula (15), and Formula (16), $R^{15}$ is derived from a compound, monomer, and/or polymer having at least two thiol groups, such as, for example, a dithiol of Formula (17):

(17)

wherein $R^{15}$ is selected from $C_{2-10}$ alkanediyl, $C_{2-10}$ oxyalkanediyl, $C_{6-8}$ cycloalkanediyl, $C_{6-10}$ alkanecycloalkanediyl, $C_{5-8}$ heterocycloalkanediyl, and $-[-(CHR^{17})_s-X-]_q-(CHR^{17})_r-$; wherein:
each $R^{17}$ is independently selected from hydrogen and methyl;
each X is independently selected from —O—, —S—, —NH—, and —NR— wherein R is selected from hydrogen and methyl;
s is an integer from 2 to 6;
q is an integer from 1 to 5; and
r is an integer from 2 to 10.

In certain embodiments of dithiols of Formula (17), each $R^{15}$ is $C_{2-6}$ n-alkanediyl, such as, for example, 1,2-ethanedithiol, 1,3-propanedithiol, 1,4-butanedithiol, 1,5-pentanedithiol, or 1,6-hexanedithiol.

Other suitable dithiols include dithiols wherein $R^{15}$ is $C_{3-6}$ branched alkanediyl, having one or more pendent groups which can be, for example, methyl or ethyl. Examples of dithiols wherein $R^{15}$ is branched alkanediyl include 1,2-propanedithiol, 1,3-butanedithiol, 2,3-butanedithiol, 1,3-pentanedithiol, and 1,3-dithio-3-methylbutane. Other suitable dithiols include those in which $R^{15}$ is selected from $C_{6-8}$ cycloalkanediyl and $C_{6-10}$ alkanecycloalkanediyl, such as, for example, dipentenedimercaptan and ethylcyclohexyldithiol (ECHDT).

Further suitable dithiols include dithiols of Formula (17) having one or more heteroatom substituents in the carbon backbone, such as, dithiols in which X is a heteroatom such as O, S or another bivalent heteroatom radical; a secondary or tertiary amine group, i.e., —NR—, where R is hydrogen or methyl; or another substituted trivalent heteroatom. In certain embodiments of dithiols of Formula (17), X is O or S, and $R^{15}$ is $-[(CHR^{17})_s-O-]_q-(CHR^{17})_r-$ or $-[(CHR^{17})_s-S-]_q-(CHR^{17})_r-$. In certain embodiments, the indices s and r are equal, and, in some cases, both have the value of 2. Examples of dithiols of this type include dimercaptodiethylsulfide (DMDS) (each of s and r is 2; q is 1; X is S); dimercaptodioxaoctane (DMDO) (each of s, q, and r is 2; X is O); and 1,5-dimercapto-3-oxapentane (each of s and r is 2; q is 1; X is O). In certain embodiments, dithiols of Formula (17) include both heteroatom substituents in the carbon backbone and pendent alkyl, such as methyl, groups. Such dithiols include methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CH(CH_3)CH_2$—SH and HS—$CH(CH_3)CH_2$—S—$CH_2CH(CH_3)$—SH. In certain embodiments, a dithiol of Formula (17) includes two or more different dithiols of Formula (17).

In certain embodiments of polythioethers of Formula (13), Formula (14), Formula (15), and Formula (16), $R^{15}$ is $C_{2-6}$ n-alkanediyl, and a dithiol of Formula (17) is, for example, ethane 1,2-dithiol, propane 1,3-dithiol, butane 1,4-dithiol, pentane 1,5-dithiol, or hexane 1,6-dithiol. In certain embodiments, $R^{15}$ is $C_{3-6}$ branched alkanediyl having one or more pendent groups, and a dithiol of Formula (17) is, for example, propane 1,2-dithiol, butane 1,3-dithiol, butane 2,3-dithiol, pentane 1,3-dithiol, or 3-methylbutane-1,3-dithiol. In certain embodiments, $R^{15}$ is selected from $C_{6-8}$ cycloalkanediyl and $C_{6-10}$ alkanecycloalkanediyl, and a dithiol of Formula (17) is, for example, dipentylenedimercaptan and ethylcyclohexylenedithiol (ECHDT).

Polythiols having the structure of Formula (17) may be prepared by reacting, for example, a divinyl ether or mixture of divinyl ethers with an excess of a dithiol or a mixture of dithiols. In certain embodiments, n+1 moles of a polythiol having the structure of Formula (17) or a mixture of at least two polythiols having the structure of Formula (17) may be reacted with n moles of a polyvinyl ether having the structure of Formula (26):

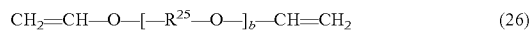

(26)

wherein:
each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CH_2)_s-X-]_q-(CH_2)_r-$; wherein each X is independently selected from —O—, —S— and —NR—, wherein R is selected from hydrogen and methyl;

each s is independently an integer from 2 to 6;

each q is independently an integer from 0 to 5;

each r is independently an integer from 2 to 10; and each b is independently an integer from 0 to 10.

Polyvinyl ethers can comprise compounds having at least one oxyalkanediyl group, and in certain embodiments from 1 to 4 oxyalkanediyl groups, such as compounds in which b is an integer from 1 to 4. In certain embodiments, b is an integer from 2 to 4. In certain embodiments, polyvinyl ethers comprise polyvinyl ether mixtures. Such mixtures are characterized by a non-integral average value of the number of alkyleneoxy groups per molecule. Thus, b in Formula (26) can also take on rational number values between 0 and 10.0, in certain embodiments between 1.0 and 10.0, in certain embodiments between 1.0 and 4.0, and in certain embodiments between 2.0 and 4.0.

Polyvinyl ether monomers can comprise divinyl ether monomers, such as divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, and polytetrahydrofuryl divinyl ether; trivinyl ether monomers such as trimethylolpropane trivinyl ether; tetrafunctional vinyl ether monomers such as pentaerythritol tetravinyl ether; and mixtures thereof. In certain embodiments, a polyvinyl ether monomer can further comprise one or more pendent groups selected from alkylene groups, hydroxyl groups, alkeneoxy groups, and amine groups.

Polythiols having the structure of Formula (17) may be prepared by reacting compounds having olefinic groups, such as vinylcyclohexanediyl In certain embodiments, polyvinyl ethers in which $R^{25}$ is a $C_{2-6}$ branched alkanediyl can be prepared by reacting a polyhydroxyl compound with acetylene. Examples of compounds of this type include compounds in which $R^{25}$ is an alkyl-substituted methanediyl group such as —CH(CH$_3$)—, for example, Pluriol™ blends such as Pluriol™ E-200 divinyl ether (BASF Corp.) for which $R^{25}$ is ethylene and m is 3.8, or an alkyl-substituted ethylene, such as —CH$_2$CH(CH$_3$)—, for example, DPE™ polymeric blends including DPE™-2 and DPE™-3 (International Specialty Products).

The reaction between a dithiol and a polyvinyl ether to prepare a polythiol having the structure of Formula (17) is described in U.S. Pat. No. 5,912,319.

The reaction between a dithiol and a polyvinyl ether to prepare a polythiol having the structure of Formula (17) may take place in the presence of a catalyst. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalysts, such as Vazo™-57 (Du Pont), Vazo™-64 (Du Pont), Vazo™-67 (Du Pont), V-70™ (Wako Specialty Chemicals), and V-65B™ (Wako Specialty Chemicals). Examples of other suitable free-radical catalysts include alkyl peroxides, such as t-butyl peroxide.

$R^{16}$ is a divalent linking group, and in certain embodiments is selected from $C_{3-20}$ alkanediyl and $C_{3-20}$ oxyalkanediyl; $C_{3-16}$ alkanediyl and $C_{3-16}$ oxyalkanediyl; $C_{3-12}$ alkanediyl and $C_{3-12}$ oxyalkanediyl; $C_{3-8}$ alkanediyl and $C_{3-8}$ oxyalkanediyl; and in certain embodiments, $C_{3-5}$ alkanediyl and $C_{3-5}$ oxyalkanediyl. In certain embodiments, $R^{16}$ may be derived from a monoepoxide having the structure of Formula (32):

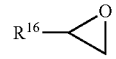
(32)

where $R^{16}$ includes groups that are reactive with sulfides such as, for example, olefinic groups. An olefinic group is selected from $C_{3-20}$ alkene-yl and $C_{3-20}$ oxyalkene-yl; $C_{3-16}$ alkene-yl and $C_{3-16}$ oxyalkene-yl; $C_{3-12}$ alkene-yl and $C_{3-12}$ oxyalkene-yl; $C_{3-8}$ alkene-yl and $C_{3-8}$ oxyalkene-yl; and in certain embodiments, $C_{3-5}$ alkene-yl and $C_{3-5}$ oxyalkene-yl. In certain embodiments, the monoepoxides having the structure of Formula (32) include allyl glycidyl ether (2-((allyloxy)methyl)oxirane), 1,2-epoxy-5-hexene (2-(but-3-en-1-yl)oxirane), 1,2-epoxy-7-octene (2-(hex-5-en-1-yl)oxirane), 1,2-epoxy-9-decene (2-(oct-7-en-1-yl)oxirane), 4-vinyl-1-cyclohexene 1,2-epoxide (3-vinyl-7-oxabicyclo[4.1.0]heptane), butadiene monoepoxide (2-vinyloxirane), isoprene monoepoxide, and limonene monoepoxide ((4R)-4-isopropyl-1-methyl-7-oxabicyclo[4.1.0]heptane).

In certain embodiments of polythioethers of Formula (13), Formula (14), Formula (15), and Formula (16), each $R^{16}$ is independently selected from $C_{3-10}$ alkanediyl and $C_{3-10}$ oxyalkanediyl; $C_{3-8}$ alkanediyl and $C_{3-8}$ oxyalkanediyl; $C_{3-6}$ alkanediyl and $C_{3-6}$ oxyalkanediyl; and in certain embodiments, $C_{3-4}$ alkanediyl and $C_{3-4}$ oxyalkanediyl.

In certain embodiments of polythioethers of Formula (13), Formula (14), Formula (15), and Formula (16), —R$^{16}$—S—R$^{15}$—S—R$^{16}$— has the structure of Formula (18):

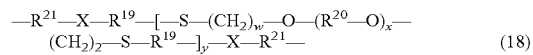
(18)

wherein:

each $R^{19}$ is independently selected from $C_{2-10}$ alkanediyl, $C_{2-10}$ oxyalkanediyl, $C_{6-8}$ cycloalkanediyl, $C_{6-10}$ alkanecycloalkanediyl, $C_{5-8}$ heterocycloalkanediyl, and —[—(CHR$^{17}$)$_s$—X—]$_q$—(CHR$^{17}$)$_r$—; wherein each $R^{17}$ is independently selected from hydrogen and methyl;

each X is independently selected from O, S, —NH—, and —NR— wherein R is selected from hydrogen and methyl;

s is an integer from 2 to 6;

q is an integer from 1 to 5; and r is an integer from 2 to 10;

each w is independently an integer from 2 to 6;

x is an integer from 0 to 50;

y is an integer from 1 to 60;

each $R^{20}$ and $R^{21}$ is independently selected from $C_{3-20}$ alkanediyl and $C_{3-20}$ oxyalkanediyl.

Other embodiments of —R$^{16}$—S—R$^{15}$—S—R$^{16}$— are disclosed in U.S. Pat. Nos. 7,879,955 and 7,622,548.

In certain embodiments of polythioethers of Formula (13), Formula (14), Formula (15), and Formula (16), each —R$^{16}$—S—R$^{15}$—S—R$^{16}$— has the structure of Formula (19):

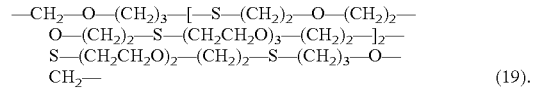
(19).

In certain embodiments of polythioether adducts of Formula (13) and Formula (14), each $R^1$ is hydrogen and each $R^2$ is hydrogen.

In certain embodiments of polythioether adducts of Formula (13) and Formula (14), m is selected from 0 and 1.

In certain embodiments of polythioether adducts of Formula (13) and Formula (14), each n is 1, each n is 2, each n is 3, and in certain embodiments, each n is 4.

In certain embodiments of polythioether adducts of Formula (13) and Formula (14), each p is 1, each p is 2, each p is 3, and in certain embodiments, each p is 4.

In certain embodiments of polythioether adducts of Formula (13) and Formula (14), each Y is O.

In certain embodiments of polythioether adducts of Formula (13) and Formula (14), each Y is S.

In certain embodiments of polythioether adducts of Formula (13) and Formula (14), each A is the same.

In certain embodiments of polythioether adducts of Formula (13) and Formula (14), each A is selected from 2-aminophenyl, 3-aminophenyl, and 4-aminophenyl.

In certain embodiments of polythioether adducts of Formula (14) and Formula (16), z is 3, z is 4, z is 5, and in certain embodiments, z is 6.

In certain embodiments of polythioether adducts of Formula (13, and Formula (14), each $R^1$ and $R^2$ is hydrogen; m is 0; p is 2; each Y is O; and each A is the same and is selected from 2-aminophenyl, 3-aminophenyl, and 4-aminophenyl. In certain embodiments of polythioether adducts of Formula (13) and Formula (14), each $R^1$ and $R^2$ is hydrogen; m is 1; n is 1; p is 2; each Y is O; and each A is the same and is selected from 2-aminophenyl, 3-aminophenyl, and 4-aminophenyl. In certain embodiments of polythioether adducts of Formula (13) and Formula (14), each $R^1$ and $R^2$ is hydrogen; m is 0; p is 2; each Y is S; and each A is the same and is selected from 2-aminophenyl, 3-aminophenyl, and 4-aminophenyl. In certain embodiments of a polyamine of polythioether adducts of Formula (13) and Formula (14), each $R^1$ and $R^2$ is hydrogen; m is 1; n is 1; p is 2; each Y is S; and each A is the same and is selected from 2-aminophenyl, 3-aminophenyl, and 4-aminophenyl.

In certain embodiments of polythioethers of Formula (14) and Formula (16), a z-valent polyfunctionalizing agent $B(V)_z$, can be selected from, for example, a multifunctional carboxylic acid such as trimellitic acid (5-acetylisobenzofuran-1,3-dione hydrate) and tricarballylic acid (propane-1,2,3-tricarboxylic acid), polythiols such as described in U.S. Pat. Nos. 4,366,307, 4,609,762, and 5,225,472, and triamines such as diethylene triamine (N-(2-aminoethyl)ethane-1,2-diamine) and triethylene tetramine (N,N-(ethane-1,2-diyl)bis(ethane-1,2-diamine).

In certain embodiments of polythioether adducts of Formula (14) and Formula (16), the z-valent polyfunctionalizing agent V comprises a terminal group that is reactive with an epoxy group, such as an amine group, an isocyanate group, acid group, anhydride group, and a thiol group.

In certain embodiments of polythioether adducts of Formula (14) and Formula (16), each V' is derived from a group having a terminal amine group selected from an amine group, an isocyanate group, acid group, anhydride group, and a thiol group In certain embodiments of an epoxy reaction to form a flexible amine-terminated polythioether adduct, the difunctional flexible polyamine of Formula (1) is selected from 2,2'-(2,2'-methylenebis(oxy)bis(ethane-2,1-diyl)bis(sulfanediyl))dianiline, 4,4'-(2,2'-methylenebis(oxy)bis(ethane-2,1-diyl)bis(oxy))dianiline, 4,4'-(2,2'-methylenebis(oxy)bis(ethane-2,1-diyl)bis(sulfanediyl))dianiline, and 2,2'-(ethane-1,2-diylbis(sulfanediyl))dianiline, 2,2'-methylenebis(sulfanediyl)dianiline.

Epoxy-terminated polythioethers of Formula (15) and Formula (16) and methods of synthesizing such polythioethers are disclosed in U.S. Pat. Nos. 7,879,955 and 7,622,548.

In certain embodiments, an amine-terminated polythioether adduct further comprise the reaction products of reactants comprising reactant (c) a carboxylic acid catalyst. In certain embodiments, the carboxylic acid catalyst is salicylic acid. Certain reactions of thiol-terminated polythioethers such as certain thiol-terminated polythioethers disclosed in U.S. Pat. No. 7,879,955 with amines including polyamines are difficult to drive to 100% completion. Because of the unreacted materials, such systems can have a short pot life, require special mixing equipment, and can be relatively hard when cured. Such systems also have the disadvantage that they cannot be listed with the United States Environmental Protection Agency. It has been discovered that the reaction of certain thiol-terminated polythioethers disclosed U.S. Pat. No. 7,879,955 with amines and polyamines can be driven to 100% completion or to near 100% completion using carboxylic acid catalysts such as salicylic acid.

In certain embodiments, an amine-terminated polythioether adduct is selected from an adduct of Formula (20), an adduct Formula (21), and a combination thereof:

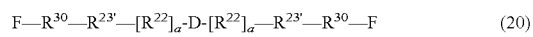

$$F-R^{30}-R^{23'}-[R^{22}]_a-D-[R^{22}]_a-R^{23'}-R^{30}-F \quad (20)$$

$$B(-D-[R^{22}]_a-R^{23'}-R^{30}-F)_z \quad (21)$$

wherein:

D has the structure of Formula (22);

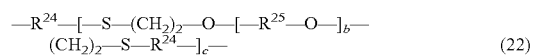

$$-R^{24}-[-S-(CH_2)_2-O-[-R^{25}-O-]_b-(CH_2)_2-S-R^{24}-]_c- \quad (22)$$

wherein:
each $R^{24}$ is independently selected from $C_{2-6}$ alkanediyl, $C_{6-8}$ cycloalkanediyl, $C_{6-10}$ alkanecycloalkanediyl, $-[(CH_2)_s-X-]_q-(CH_2)_r-$, and $-[(CH_2)_s-X-]_q-(CH_2)_r-$ wherein at least one $-CH_2-$ group is substituted with a methyl group;
each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CH_2)_s-X-]_q-(CH_2)_r-$;
each X is independently selected from $-O-$, $-S-$ and $-NR-$,
wherein R is selected from hydrogen and methyl;
each b is independently an integer from 0 to 10;
each c is independently an integer from 1 to 60;
each s is independently an integer from 2 to 6;
each q is independently an integer from 0 to 5; and
each r is independently an integer from 2 to 10;
each a is independently selected from 0 and 1;
each $R^{22}$ is independently $-S-(CH_2)_2-[O-R^{25}]_b-O-$;
each $R^{23'}$ is independently selected from $-S-$ and $-S-(CH_2)_{2+d}-O-R^{26'}-$ when a is 0, or from $-(CH_2)_2-S-R^{26'}-$ when a is 1, wherein:
each d is independently an integer from 0 to 10; and
each $R^{26'}$ is independently selected from $C_{1-6}$ alkanediyl and substituted $C_{1-6}$ alkanediyl wherein the at least one substituent is selected from $-O-$ and $-NR-$ wherein R is selected from hydrogen and $C_{1-6}$ alkyl;
B is a core of a z-valent polyfunctionalizing agent $B(R)_z$ wherein:
each R is independently selected from a terminal group comprising a group that is reactive with a —SH group and a terminal group comprising a group that is reactive with a —CH=CH$_2$ group; and z is an integer from 3 to 6;

each R$^{30}$ is independently a moiety selected from a moiety derived from a diisocyanate and a moiety derived from an ethylenically unsaturated group; and each F is independently an amine-terminated group of Formula (1'):

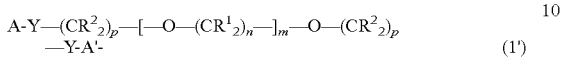
(1')

wherein:
m is an integer from 0 to 4;
each n is independently an integer from 1 to 4;
each p is independently an integer from 1 to 4;
A is amino-substituted phenyl;
-A'- is

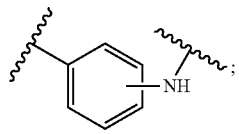

each Y is independently selected from O and S;
each R$^1$ is independently selected from hydrogen and C$_{1-3}$ alkyl; and
each R$^2$ is independently selected from hydrogen and C$_{1-3}$ alkyl.

In certain embodiments, an amine-terminated polythioether adduct provided by the present disclosure comprises the reaction products of reactants comprising:

(a) an isocyanate-terminated polythioether comprising the reaction products of reactants comprising:
(i) a polythioether selected from a polythioether of Formula (23), a polythioether of Formula (24), and a combination thereof:

$R^{23}$—$[R^{22}]_a$-D-$[R^{22}]_a$—$R^{23}$ (23)

$B(-D-[R^{22}]_a—R^{23})_z$ (24)

wherein:
D has the structure of Formula (22);

(22)

wherein:
each R$^{24}$ is independently selected from C$_{2-6}$ alkanediyl, C$_{6-8}$ cycloalkanediyl, C$_{6-10}$ alkanecycloalkanediyl, —[(CH$_2$)$_s$—X—]$_q$—(CH$_2$)$_r$—, and —[(CH$_2$)$_s$—X—]$_q$—(CH$_2$)$_r$— wherein at least one —CH$_2$— group is substituted with a methyl group;
each R$^{25}$ is independently selected from C$_{2-6}$ alkanediyl, C$_{6-8}$ cycloalkanediyl, C$_{6-10}$ alkanecycloalkanediyl, C$_{5-8}$ heterocycloalkanediyl, and —[(CH$_2$)$_s$—X—]$_q$—(CH$_2$)$_r$—;
each X is selected from —O—, —S— and —NR—, wherein R is selected from hydrogen and methyl;
each b is independently an integer from 0 to 10;
each c is independently an integer from 1 to 60;
each s is independently an integer from 2 to 6;
each q is independently an integer from 0 to 5; and
each r is independently an integer from 2 to 10;
each a is independently selected from 0 and 1;
each R$^{22}$ is independently —S—(CH$_2$)$_2$—[O—R$^{25}$]$_b$—O—;
each R$^{23}$ is independently selected from —SH and —S—(CH$_2$)$_{2+d}$—O—R$^{26}$ when a is 0, or from —(CH$_2$)$_2$—S—R$^{26}$ when a is 1, wherein:
each d is independently an integer from 0 to 10; and
each R$^{26}$ is independently selected from C$_{1-6}$ alkyl and substituted C$_{1-6}$ alkyl wherein the at least one substituent is selected from —OH and —NHR wherein R is selected from hydrogen and C$_{1-6}$ alkyl;

B is a core of a z-valent polyfunctionalizing agent $B(R)_z$ wherein:
each R is independently selected from a terminal group comprising a group that is reactive with a —SH group and a group comprising a terminal group that is reactive with a —CH=CH$_2$ group; and
z is an integer from 3 to 6; and
(ii) a diisocyanate; and (b) a polyamine of Formula (1):

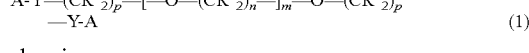
(1)

wherein:
m is an integer from 0 to 4;
each n is independently an integer from 1 to 4;
each p is independently an integer from 1 to 4;
each A is independently amino-substituted phenyl;
each Y is independently selected from O and S;
each R$^1$ is independently selected from hydrogen and C$_{1-3}$ alkyl; and
each R$^2$ is independently selected from hydrogen and C$_{1-3}$ alkyl.

In certain embodiments of polythioethers of Formula (20), Formula (21), Formula (22), and Formula (23), a is 0.

In certain embodiments of polythioethers of Formula (23) and Formula (24), R$^{23}$ is —SH.

In certain embodiments of polythioethers of Formula (23) and Formula (24), a is 0 and R$^{23}$ is —SH.

In certain embodiments of polythioethers of Formula (23) and Formula (24), where a is 0 and R$^{23}$ is —SH; if b is 1 and R$^{25}$ is n-butanediyl, R$^{24}$ is not ethanediyl or n-propanediyl; and if b is 1, each of s, q, and r is 2; and R$^{25}$ is ethanediyl; then X is not —O—.

In certain embodiments of polythioethers of Formula (23) and Formula (24), a is 0; R$^{23}$ is —SH; and R$^{23}$ is —S—(—CH$_2$—)$_2$—O—R$^{26}$.

In certain embodiments of polythioethers of Formula (23) and Formula (24), a is 0; R$^{23}$ is —SH; and R$^{26}$ is selected from ethene-yl, butanol-yl, and aminopropane-yl.

In certain embodiments of polythioethers of Formula (23) and Formula (24), a is 1; R$^{23}$ is —(CH$_2$—)$_2$—S—R$^{26}$; and R$^{26}$ is —OH substituted C$_{2-4}$ alkyl.

In certain embodiments of polythioethers of Formula (21) and (24), z is 3.

In certain embodiments, a polythioether is a combination of polythioethers of Formula (23) and Formula (24) having an average functionality from about 2.05 to 3.00.

In certain embodiments, an amine-terminated polythioether adduct is a combination of polythioethers of Formula (20) and Formula (21) having an average functionality from about 2.05 to 3.00.

In certain embodiments of amine-terminated polythioethers of Formula (20) and Formula (21), each R$^1$ is hydrogen and each R$^2$ is hydrogen.

In certain embodiments of amine-terminated polythioethers of Formula (20) and Formula (21), m is selected from 0 and 1.

In certain embodiments of amine-terminated polythioethers of Formula (20) and Formula (21), each n is 1, each n is 2, each n is 3, and in certain embodiments, each n is 4.

In certain embodiments of amine-terminated polythioethers of Formula (20) and Formula (21), each p is 1, each p is 2, each p is 3, and in certain embodiments, each p is 4.

In certain embodiments of amine-terminated polythioethers of Formula (20) and Formula (21), each Y is O.

In certain embodiments of amine-terminated polythioethers of Formula (20) and Formula (21), each Y is S.

In certain embodiments of amine-terminated polythioethers of Formula (20) and Formula (21), each A is the same.

In certain embodiments of amine-terminated polythioethers of Formula (20) and Formula (21), each A is selected from 2-aminophenyl, 3-aminophenyl, and 4-aminophenyl.

In certain embodiments of amine-terminated polythioether adducts of Formula (20) and Formula (21), each $R^1$ and $R^2$ is hydrogen; m is 0; p is 2; each Y is O; and each A is the same and is selected from 2-aminophenyl, 3-aminophenyl, and 4-aminophenyl. In certain embodiments of amine-terminated polythioethers of Formula (20) and Formula (21), each $R^1$ and $R^2$ is hydrogen; m is 1; n is 1; p is 2; each Y is O; and each A is the same and is selected from 2-aminophenyl, 3-aminophenyl, and 4-aminophenyl. In certain embodiments of amine-terminated polythioethers of Formula (20) and Formula (21), each $R^1$ and $R^2$ is hydrogen; m is 0; p is 2; each Y is S; and each A is the same and is selected from 2-aminophenyl, 3-aminophenyl, and 4-aminophenyl. In certain embodiments of amine-terminated polythioethers of Formula (20) and Formula (21), each $R^1$ and $R^2$ is hydrogen; m is 1; n is 1; p is 2; each Y is S; and each A is the same and is selected from 2-aminophenyl, 3-aminophenyl, and 4-aminophenyl.

In certain embodiments of amine-terminated polythioether adducts of Formula (20) and Formula (21), each $R^{30}$ is a moiety derived from a cycloaliphatic diisocyanate such as 4,4' methylene dicyclohexyl diisocyanate ($H_{12}$MDI) or isophorone diisocyanate.

Examples of suitable polyfunctionalizing agents $B(R)_z$ include trifunctionalizing agents, that is, compounds with z is 3. In certain embodiments, a trifunctionalizing agent is selected from triallylcyanurate (TAC), which is reactive with terminal thiol groups, such as 1,2,3-propanetrithiol, which is reactive with terminal allyl groups or vinyl ether groups. Polyfunctionalizing agents having mixed functionality, i.e., agents that include moieties (typically separate moieties), that react with both thiol and vinyl groups, may also be employed.

Other useful polyfunctionalizing agents include trimethylolpropane trivinyl ether, and the polythiols described in U.S. Pat. Nos. 4,366,307, 4,609,762 and U.S. Pat. No. 5,225,472. Combinations of polyfunctionalizing agents having the same terminal groups such as thiol groups or allyl groups may also be used.

Polyfunctionalizing agents having more than three reactive moieties (i.e., z>3) afford star polythioethers and hyperbranched polythioethers. For example, two moles of TAC may be reacted with one mole of a dithiol to afford a material having an average functionality of 4. This material may then be reacted with a divinyl ether and a dithiol to yield a polymer, which may in turn be mixed with a trifunctionalizing agent to afford a polymer blend having an average functionality between 3 and 4. Polythioethers as described above may have a wide range of average functionality. For example, trifunctionalizing agents afford average functionalities from about 2.05 to about 3.0, or in certain embodiments, from about 2.1 to about 2.6. Wider ranges of average functionality may be achieved by using tetrafunctional or higher polyfunctionalizing agents. Functionality will also be affected by factors such as stoichiometry, as is known to those skilled in the art.

In certain embodiments, polythioethers of Formula (23) and Formula (24) are thiol-terminated polythioethers. In certain embodiments, a thiol-terminated polythioether of Formula (23) has the structure of Formula (25):

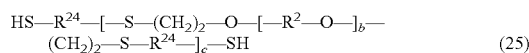

Polythioethers of Formula (23) and Formula (24) may be prepared by a number of methods. In certain embodiments, (n+1) moles of a dithiol of Formula (17):

or a mixture of at least two different dithiols of Formula (17) may be reacted with n moles of a divinyl ether of Formula (26):

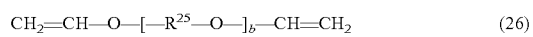

or a combination of at least two different divinyl ethers of Formula (26), in the presence of a catalyst. In Formula (26), $R^{25}$ and b are defined as in Formula (22). This method affords an uncapped, thiol-terminated difunctional polythioether.

Compounds of Formula (17) are dithiol compounds. In certain embodiments of dithiols of Formula (17), $R^{15}$ is $C_{2-6}$ n-alkanediyl, such as 1,2-ethanedithiol, 1,3-propanedithiol, 1,4-butanedithiol, 1,5-pentanedithiol, and 1,6-hexanedithiol.

In certain embodiments, $R^{15}$ is a $C_{3-6}$ branched alkanediyl group, having one or more pendent groups which can be, for example, methyl or ethyl. In certain embodiments, $R^{15}$ is selected from 1,2-propanedithiol, 1,3-butanedithiol, 2,3-butanedithiol, 1,3-pentanedithiol, and 1,3-dithio-3-methylbutane. In certain embodiments, $R^{15}$ is selected from $C_{6-8}$ cycloalkanediyl and $C_{6-10}$ alkanecycloalkanediyl, such as, for example, dipentenedimercaptan and ethylcyclohexyldithiol (ECHDT).

In certain embodiments, dithiols of Formula (17) one or more heteroatom substituents in the carbon backbone, that is, dithiols in which X is a heteroatom such as O, S or another bivalent heteroatom radical; a secondary or tertiary amine group such as —NR—, where R is hydrogen or methyl; or another substituted trivalent heteroatom. In certain embodiments, X is O or S, and thus $R^{15}$ is —[(CH$_2$)$_s$—O—]$_q$—(CH$_2$)$_r$— or —[(CH$_2$—)$_s$—S—]$_q$—(CH$_2$)$_r$—. In certain embodiments, s and r are the same, and in certain embodiments, each of s and r is 2. In certain embodiments, a dithiol of Formula (17) are selected from dimercaptodiethylsulfide (DMDS) (each of p and r is 2; q is 1; X is S); dimercaptodioxaoctane (DMDO) (each of p, q, and r is 2; X is O); and 1,5-dithia-3-oxapentane. In certain embodiments, dithiols of Formula (17) include both heteroatom substituents in the carbon backbone and pendent alkyl groups such as methyl. Such compounds include methyl-substituted DMDS, such as HS—CH$_2$CH(CH$_3$)—S—CH$_2$CH$_2$—SH and HS—CH(CH$_3$)CH$_2$—S—CH$_2$CH$_2$—SH, and dimethyl substituted DMDS such as HS—CH$_2$CH(CH$_3$)—S—CH(CH$_3$)CH$_2$—SH and HS—CH(CH$_3$)CH$_2$—S—CH$_2$CH(CH$_3$)—SH.

Two or more different dithiols of Formula (17) may also be employed in preparing polythioethers of Formula (23 and Formula (24).

Compounds of Formula (26) are divinyl ethers. Divinyl ether itself (m is 0) maybe used. In certain embodiments, divinyl ethers include those compounds having at least one oxyalkanediyl group, and in certain embodiments, 1 to 4 oxyalkanediyl groups (i.e., those compounds in which b is an integer from 1 to 4). In certain embodiments of divinyl ethers of Formula (26), b is an integer from 2 to 4. In certain embodiments, divinyl ethers of Formula (26) are commercially available divinyl ether mixtures. Such mixtures are characterized by a non-integral average value for the number of alkoxy units per molecule. Thus, b in Formula (26) may also take on non-integral, rational values between 0 and 10, such as between 1 and 10, very preferably between 1 and 4, and in certain embodiments, between 2 and 4.

Examples of suitable divinyl ethers include those compounds in which $R^{25}$ is $C_{2-6}$ n-alkanediyl or $C_{2-6}$ branched alkanediyl. Examples of divinyl ethers of this type include ethylene glycol divinyl ether (EG-DVE) ($R^{25}$ is ethanediyl, b is 1); butanediol divinyl ether (BD-DVE) ($R^{25}$ is butanediyl, b is 1); hexanediol divinyl ether (HD-DVE) ($R^{25}$ is hexanediyl, b is 1); diethylene glycol divinyl ether (DEG-DVE) ($R^{25}$ is ethanediyl, b is 2); triethylene glycol divinyl ether ($R^{25}$ is ethanediyl, b is 3); and tetraethylene glycol divinyl ether ($R^{25}$ is ethanediyl, b is 4). Useful divinyl ether blends include Pluriol™ type blends such as Pluriol™ E-200 divinyl ether (BASF), for which $R^{25}$ is ethyl and b is 3.8, as well as DPE polymeric blends such as DPE-2 and DPE-3 (International Specialty Products, Wayne, N.J.). In certain embodiments, a divinyl ether of Formula (26) is selected from DEG-DVE and Pluriol™ E-200.

Suitable divinyl ethers in which $R^{25}$ is $C_{2-6}$ branched alkanediyl may be prepared by reacting a polyhydroxyl compound with acetylene. Examples of divinyl ethers of this type include compounds in which $R^{25}$ is an alkyl-substituted methanediyl group such as —CH(CH$_3$)— or an alkyl-substituted ethanediyl such as —CH$_2$CH(CH$_3$)—.

Other suitable divinyl ethers include compounds in which $R^{25}$ is polytetrahydrofuryl (poly-THF) or polyoxyalkanediyl, for example having an average of about 3 monomer units.

Two or more divinyl ethers of Formula (26) may be used in the foregoing method. Thus, in certain embodiments, two compounds of Formula (17) and one compound of Formula (26), one compound of Formula (17) and two compounds of Formula (26), two compounds of Formula (17) and of Formula (26), and more than two compounds of one or both formulas, may be used to produce a variety of polythioethers provided by the present disclosure.

The reaction between the compounds of Formula (17) and Formula (26) may be catalyzed by a free radical catalyst. Examples of suitable free radical catalysts include azo compounds, for example azobisnitrile compounds such as azo (bis)isobutyronitrile (AIBN); organic peroxides such as benzoyl peroxide and t-butyl peroxide; and similar free-radical generators. The reaction may also be affected by irradiation with ultraviolet light, either with or without a cationic photo-initiating moiety. Ionic catalysis methods, using either inorganic or organic bases, such as triethylamine, may also be employed.

A diisocyanate used in the synthesis of amine-terminated polythioethers may be an aliphatic diisocyanate, alicyclic diisocyanate, aromatic diisocyanate, or a combination of any of the foregoing, as disclosed herein. In certain embodiments, $R^{30}$ is derived from a cycloaliphatic diisocyanate such as 4,4'-methylene dicyclohexyl diisocyanate (H$_{12}$ MDI), isophorone diisocyanate, or a combination thereof.

In certain embodiments, an amine-terminated polythioether adduct provided by the present disclosure comprises the reaction products of reactants comprising:
(a) an isocyanate-terminated polythioether adduct comprising the reaction product of reactants comprising:
(i) a dithiol of Formula (17):

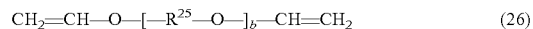

HS—R$^{15}$—SH (17)

wherein:
R$^{15}$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^{17}$)$_s$—X—]$_q$—(CHR$^{17}$)$_r$—; wherein:
each R$^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10.
(ii) a divinyl ether of Formula (26):

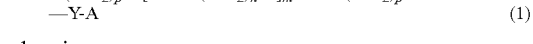

CH$_2$=CH—O—[—R$^{25}$—O—]$_b$—CH=CH$_2$ (26)

wherein:
each R$^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[(CH$_2$)$_s$—X—]$_q$—(CH$_2$)$_r$—; wherein
each X is selected from —O—, —S— and —NR—, wherein R is selected from hydrogen and methyl;
each s is independently an integer from 2 to 6;
each q is independently an integer from 0 to 5; and
each r is independently an integer from 2 to 10; and
each b is independently an integer from 0 to 10; and
(iii) a diisocyanate; and
(b) a polyamine of Formula (1):

A-Y—(CR$^2_2$)$_p$—[—O—(CR$^1_2$)$_n$—]$_m$—O—(CR$^2_2$)$_p$—Y-A (1)

wherein:
m is an integer from 0 to 4;
each n is independently an integer from 1 to 4;
each p is independently an integer from 1 to 4;
each A is independently amino-substituted phenyl;
each Y is independently selected from O and S;
each R$^1$ is independently selected from hydrogen and $C_{1-3}$ alkyl; and
each R$^2$ is independently selected from hydrogen and $C_{1-3}$ alkyl.

In certain embodiments, the thiol-terminated polythioether adduct (a) comprises the reaction product of reactants further comprising B(R)$_z$, wherein B is a core of a z-valent polyfunctionalizing agent B(R)$_z$; each R comprises a group that is reactive with a terminal —SH group or a group that is reactive with a terminal —CH=CH$_2$ group; and z is independently selected from an integer from 3 to 6.

In certain embodiments, an isocyanate-terminated polythioether adduct (a) comprises the reaction product of reactants further comprising an alkyl ω-alkenyl ether of Formula (27):

CH$_2$=CH—(CH$_2$)$_d$—O—R$^{26}$ (27)

wherein d is an integer from 0 to 10; and R$^{26}$ is selected from $C_{1-6}$ alkyl and substituted $C_{1-6}$ alkyl wherein the one or more substituents is selected from —OH and —NHR wherein R is selected from hydrogen and $C_{1-6}$ alkyl.

Ethers of Formula (27) are alkyl ω-alkenyl ethers (ethers having a terminal ethylenically unsaturated group), which can react with terminal thiol groups to cap a polythioether polymer.

For example, capped analogs of thiol-terminated polythioethers of Formula (23) and Formula (24) may be prepared by reacting (n+1) moles of a dithiol of Formula (17) or a mixture of at least two different dithiols of Formula (17), (n) moles of a divinyl ether of Formula (26) or a mixture of at least two different divinyl ethers of Formula (26), and about 0.05 to about 2 moles of a hydroxyl-functional vinyl ether of Formula (27), or a mixture of two different hydroxyl-functional vinyl ethers of Formula (27), in the presence of an appropriate catalyst.

In certain embodiments, an alkyl ω-alkenyl ether of Formula (27), is a hydroxyl-functional vinyl ether. In certain embodiments, the hydroxyl-functional vinyl ether is 4-hydroxybutyl vinyl ether.

In certain embodiments of ethers of Formula (27), d is an integer from 0 to 10, an integer from 0 to 6, and in certain embodiments, an integer from 0 to 4. Certain examples of ethers of Formula (27) include monovinyl ethers (d is 0), such as amino- and hydroxyalkyl vinyl ethers, including 3-aminopropyl vinyl ether and 4-hydroxybutyl vinyl ether (butanediol monovinyl ether), as well as unsubstituted alkyl vinyl ethers such as ethyl vinyl ether. In certain embodiments, ethers of Formula (27) include allyl ethers (d is 1), such as 4-aminobutyl allyl ether and 3-hydroxypropyl allyl ether.

Use of 2 mole-equivalents of ethers of Formula (27) affords fully capped polymers, while use of lesser amounts results in partially capped polymers.

In certain embodiments, (n) moles of a dithiol of Formula (17), or a mixture of at least two different dithiols of Formula (17), are reacted with (n+1) moles of a divinyl ether of Formula (26), or a mixture of at least two different divinyl ethers of Formula (26), in the presence of an appropriate catalyst. This method affords an uncapped, vinyl-terminated difunctional polythioethers.

Capped analogs to the foregoing vinyl-terminated polythioethers may be prepared by reacting (n+1) moles of a divinyl ether of Formula (26) or a mixture of at least two different divinyl ethers of Formula (26), (n) moles of a dithiol of Formula (17) or a mixture of at least two different dithiols of Formula (17), and about 0.05 to about 2 moles of a monothiol of Formula (28):

HS—R$^{26}$ (28)

wherein R$^{26}$ is selected from C$_{1-6}$ alkyl and substituted C$_{1-6}$ alkyl wherein the one or more substituents is selected from —OH and —NHR wherein R is selected from hydrogen and C$_{1-6}$ alkyl, or a mixture of two different monothiols of Formula (28), in the presence of an appropriate catalyst.

Compounds of Formula (28) are monothiols, which can be unsubstituted or substituted with, for example, hydroxyl or amino groups. Examples of monothiols of Formula (28) include mercaptoalcohols such as 3-mercaptopropanol and mercaptoamines such as 4-mercaptobutylamine.

Polyfunctional analogs of the foregoing difunctional polythioethers may be prepared by combining one or more dithiols of Formula (17) and one or more divinyl ethers of Formula (26), in appropriate amounts, with a polyfunctionalizing agent as described above, and reacting the mixture. In certain embodiments, (n+1) moles a dithiol or a mixture of dithiols of Formula (17), (n) moles of a divinyl ether or mixture of divinyl ethers of Formula (26), and a z-valent polyfunctionalizing agent, are combined to form a reaction mixture. The mixture is then reacted in the presence of a suitable catalyst to afford thiol-terminated polyfunctional polythioethers. Capped analogs of multifunctional polythioethers may be prepared by including in the reaction mixture of about 0.05 to about (z) moles of one or more hydroxyl-functional vinyl ethers of Formula (27). Use of (z) moles affords fully capped polyfunctional polymers, while use of lesser amounts again yields partially capped polymers.

Similarly, (n) moles of a dithiol or combination of dithiols of Formula (17), (n+1) moles of a divinyl ether or combination of divinyl ethers of Formula (26), and a z-valent polyfunctionalizing agent, are combined to form a reaction mixture and reacted as above to afford vinyl-terminated polyfunctional polythioethers. Capped analogs of the foregoing polythioethers are prepared by inclusion in the starting reaction mixture of one or more appropriate monothiols of Formula (28).

In certain embodiments, polythioethers of Formula (23) and Formula (24) may be prepared by combining at least one dithiol of Formula (17) and at least one divinyl ether of Formula (26), optionally together with one or more hydroxyl-functional vinyl ethers of Formula (27) and/or monothiols of Formula (28), and/or a polyfunctionalizing agent, followed by addition of an appropriate catalyst, and carrying out the reaction at a temperature from about 30° C. to about 120° C. for about 2 hours to about 24 hours. In certain embodiments, the reaction is carried out at a temperature from about 70° C. to about 90° C. for about 2 to about 6 hours.

In certain embodiments, amine-terminated polythioether adducts provided by the present disclosure comprises the reaction products of reactants comprising:

(a) an isocyanate-terminated polythioether adduct comprising the reaction product of reactants comprising:
  (i) a dithiol of Formula (17):

HS—R$^{15}$—SH (17)

wherein:
R$^{15}$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^{17}$)$_s$—X—]$_q$—(CHR$^{17}$)$_r$—; wherein:
each R$^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10;

(ii) a hydroxyl-functional vinyl ether of Formula (27):

CH$_2$=CH—(CH$_2$)$_d$—O—R$^{26}$ (27)

wherein:
d is an integer from 0 to 10; and
R$^{26}$ is selected from C$_{1-6}$ alkyl and substituted C$_{1-6}$ alkyl wherein the one or more substituents is selected from —OH and —NHR wherein R is selected from hydrogen and C$_{1-6}$ alkyl; and (iii) a diisocyanate; and (b) a polyamine of Formula (1):

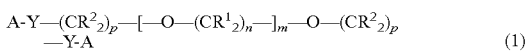

A-Y—(CR$^2_2$)$_p$—[—O—(CR$^1_2$)$_n$—]$_m$—O—(CR$^2_2$)$_p$—Y-A (1)

wherein:
m is an integer from 0 to 4;
each n is independently an integer from 1 to 4;
each p is independently an integer from 1 to 4;
each A is independently amino-substituted phenyl;
each Y is independently selected from O and S;
each R$^1$ is independently selected from hydrogen and C$_{1-3}$ alkyl; and
each R$^2$ is independently selected from hydrogen and C$_{1-3}$ alkyl.

In certain embodiments, an amine-terminated polythioether adduct provided by the present disclosure comprises the reaction products of reactants comprising:

(a) an isocyanate-terminated polythioether adduct comprising the reaction product of reactants comprising:
  (i) a dithiol of Formula (17):

HS—R$^{15}$—SH (17)

wherein:
R$^{15}$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^{17}$)$_s$—X—]$_q$—(CHR$^{17}$)$_r$—; wherein:
each R$^{17}$ is independently selected from hydrogen and methyl;
each X is independently selected from O, S, —NH—, and —NR— wherein R is selected from hydrogen and methyl;
s is an integer from 2 to 6;
q is an integer from 1 to 5; and
r is an integer from 2 to 10;
(ii) a divinyl ether of Formula (26):

wherein:
each R$^{25}$ is independently selected from C$_{2-6}$ alkanediyl, C$_{6-8}$ cycloalkanediyl, C$_{6-10}$ alkanecycloalkanediyl, C$_{5-8}$ heterocycloalkanediyl, and —[(CH$_2$)$_s$—X—]$_q$—(CH$_2$)$_r$—; wherein
each X is selected from —O—, —S— and —NR—, wherein R is selected from hydrogen and methyl;
each s is independently an integer from 2 to 6;
each q is independently an integer from 0 to 5; and
each r is independently an integer from 2 to 10; and
each b is independently an integer from 0 to 10;
(iii) a hydroxyl-functional vinyl ether of Formula (27):

wherein:
d is an integer from 0 to 10; and
R$^{26}$ is selected from C$_{1-6}$ alkyl and substituted C$_{1-6}$ alkyl wherein the one or more substituents is selected from —OH and —NHR wherein R is selected from hydrogen and C$_{1-6}$ alkyl; and
(iv) a diisocyanate; and
(b) a polyamine of Formula (1):

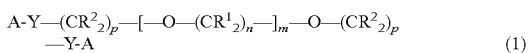

wherein:
m is an integer from 0 to 4;
each n is independently an integer from 1 to 4;
each p is independently an integer from 1 to 4;
each A is independently amino-substituted phenyl;
each Y is independently selected from O and S;
each R$^1$ is independently selected from hydrogen and C$_{1-3}$ alkyl; and
each R$^2$ is independently selected from hydrogen and C$_{1-3}$ alkyl.

In certain embodiments, an amine-terminated polythioether adduct provided by the present disclosure comprises the reaction products of reactants comprising:
(a) an isocyanate-terminated polythioether adduct comprising the reaction product of reactants comprising:
(i) a dithiol of Formula (17):

wherein:
R$^{15}$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^{17}$)$_s$—X—]$_q$—(CHR$^{17}$)$_r$—; wherein:
each R$^{17}$ is independently selected from hydrogen and methyl;

each X is independently selected from O, S, —NH—, and —NR— wherein R is selected from hydrogen and methyl;
s is an integer from 2 to 6;
q is an integer from 1 to 5; and
r is an integer from 2 to 10;
(ii) a divinyl ether of Formula (26):

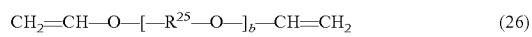

wherein:
each R$^{25}$ is independently selected from C$_{2-6}$ alkanediyl, C$_{6-8}$ cycloalkanediyl, C$_{6-10}$ alkanecycloalkanediyl, C$_{5-8}$ heterocycloalkanediyl, and —[(CH$_2$)$_s$—X—]$_q$—(CH$_2$)$_r$—; wherein
each X is selected from —O—, —S— and —NR—, wherein R is selected from hydrogen and methyl;
each s is independently an integer from 2 to 6;
each q is independently an integer from 0 to 5; and
each r is independently an integer from 2 to 10; and
each b is independently an integer from 0 to 10;
(iii) a hydroxyl-functional vinyl ether of Formula (27):

wherein:
d is an integer from 0 to 10; and
R$^{26}$ is selected from C$_{1-6}$ alkyl and substituted C$_{1-6}$ alkyl wherein the one or more substituents is selected from —OH and —NHR wherein R is selected from hydrogen and C$_{1-6}$ alkyl;
(iv) a polyfunctionalizing agent B(R$^8$)$_z$, wherein:
B is a core of a z-valent polyfunctionalizing agent B(R$^8$)$_z$;
each R$^8$ comprises a group selected from a group that is reactive with a terminal —SH group and a group that is reactive with a terminal —CH=CH$_2$ group; and
z is independently selected from an integer from 3 to 6; and
(v) a diisocyanate; and
(b) a polyamine of Formula (1):

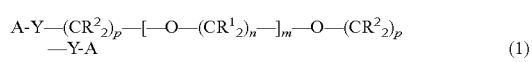

wherein:
m is an integer from 0 to 4;
each n is independently an integer from 1 to 4;
each p is independently an integer from 1 to 4;
each A is independently amino-substituted phenyl;
each Y is independently selected from O and S;
each R$^1$ is independently selected from hydrogen and C$_{1-3}$ alkyl; and
each R$^2$ is independently selected from hydrogen and C$_{1-3}$ alkyl.

In certain embodiments provided by the present disclosure, a flexible amine-terminated polythioether adduct is derived from Permapol® 3.1E or Permapol® L5534 (PRC-DeSoto International, Inc., Burbank, Calif.). For example, Permapol® 3.1E and/or Permapol® L5534 may be reacted with a flexible polyamine of Formula (1) to provide an amine-terminated polythioether adduct, including a combination of amine-terminated polythioether adducts.

In certain embodiments, compositions provided by the present disclosure comprise one or more amine-terminated adducts disclosed herein and one or more isocyanate-terminated prepolymers. An isocyanate-terminated prepolymer may be an isocyanate terminated polyformal prepolymer or an isocyanate-terminated polythioether prepolymer.

In certain embodiments, compositions provided by the present disclosure comprise the reaction products of reactants comprising (a) an amine-terminated adduct provided by the present disclosure; and (b) an isocyanate-terminated prepolymer.

In certain embodiments, an isocyanate-terminated prepolymer may be or may be based on an isocyanate-terminated polyformal prepolymer as disclosed in U.S. patent application Ser. Nos. 13/050,988 and 13/051, and U.S. Provisional Application No. 61/453,978, filed on Mar. 18, 2011; an isocyanate-terminated polythioether prepolymer as disclosed in U.S. Pat. No. 6,172,179; an isocyanate-terminated polythioether prepolymer as disclosed in U.S. Pat. Nos. 7,879,955 and 7,622,548; or a combination of any of the foregoing.

In certain embodiments, an isocyanate-terminated prepolymer comprises an isocyanate-terminated polyformal prepolymer. In certain embodiments, an isocyanate-terminated polyformal prepolymer comprises the reaction products of reactants comprising a polyformal polyol and a diisocyanate.

In certain embodiments, a polyformal polyol is selected from:
(i) the reaction products of reactants comprising a polyformal diol; and a reactant selected from an aldehyde, a ketone, and a combination thereof;
(ii) the reaction products of reactants comprising a polyformal diol; a polyol containing at least three hydroxyl groups per polyol molecule; and a reactant selected from an aldehyde, a ketone, and a combination thereof; and
(iii) a combination of (i) and (ii).

In certain embodiments, a polyformal polyol comprises a polyformal polyol selected from a polyformal polyol of Formula (6), a polyformal polyol of Formula (7), and a combination thereof:

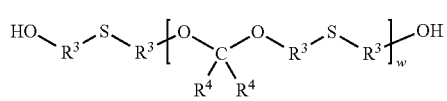

(6)

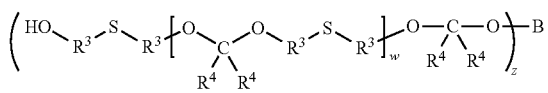

(7)

wherein:
each w is independently selected from an integer from 1 to 50;
z is an integer from 3 to 6;
each $R^3$ is independently $C_{2-6}$ alkanediyl;
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and
B represents the core of an z-valent parent polyol B(OH)$_z$.

In certain embodiments, the polyformal polyol comprises a polyformal polyol of Formula (6), a polyformal polyol of Formula (7), or a combination thereof, wherein each $R^3$ is ethane-1,2-diyl and each $R^4$ is hydrogen.

In certain embodiments, an isocyanate-terminated polyformal prepolymer is selected from a prepolymer of Formula (4), a prepolymer of Formula (5), and a combination thereof:

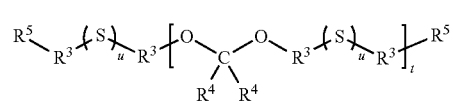

(4)

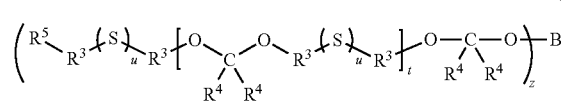

(5)

wherein:
each t is independently an integer selected from 1 to 50;
each u is independently selected from 1 and 2;
each $R^3$ is independently selected from $C_{2-6}$ alkanediyl;
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl;
B represents the core of a z-valent polyol B(OH)$_z$, wherein z is an integer from 3 to 6; and
each $R^5$ is —$OR^{5'}$ wherein $R^{5'}$ comprises an isocyanate-terminated group.

In certain embodiments, an isocyanate-terminated polyformal prepolymer comprises the reaction product of reactants comprising:
(a) a sulfur-containing polymer selected from a polymer of Formula (6), Formula (7), and a combination thereof:

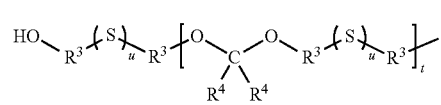

(6)

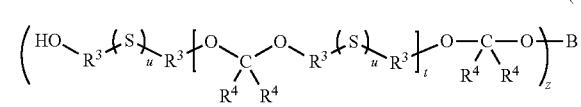

(7)

wherein:
each t is independently an integer selected from 1 to 50;
each u is independently selected from 1 and 2;
each $R^3$ is independently selected from $C_{2-6}$ alkanediyl; and
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and
(b) a compound comprising a terminal isocyanate group and a group that is reactive with the terminal hydroxyl groups of the polymer of Formula (6) or Formula (7), or combination thereof.

In certain embodiments, a compound comprising a terminal isocyanate group and a group that is reactive with the terminal hydroxyl groups of the polymer of Formula (6) or Formula (7) is selected from a diisocyanate, including any of the diisocyanates disclosed herein.

An isocyanate-terminated polyformal prepolymer may be formed by reacting a diisocyanate with a polyformal polyol. In certain embodiments, the molar ratio of the diisocyanate to the polyformal polyol is greater than 2 to 1, greater than 2.3 to 1, greater than 2.6 to 1, and in certain embodiments, greater than 3 to 1.

Isocyanate-terminated polyformal prepolymers may be formed by first reacting a polyformal polyol with a diisocyanate to form a diisocyanate-polyformal polyol adduct. The polyol adduct may then be oligomerized by reacting with additional polyformal polyol and diisocyanate to provide an isocyanate-terminated polyformal oligomer. In certain embodiments, the polyformal-isocyanate prepolymer comprises a combination of unreacted diisocyanate, the 2:1 diisocyanate-polyformal polyol adduct, and the isocyanate-terminated polyformal oligomer. An example of a reaction sequence using thiodiglycol polyformal and $H_{12}$MDI to form a $H_{12}$MDI-terminated thiodiglycol polyformal-isocyanate prepolymer is shown in FIG. 1, where w is an integer from 1 to 50, and y is an integer from 2 to 15.

The reaction used to prepare a polyformal polyol may take place in the presence of an acidic catalyst, such as sulfuric acid, sulfonic acid, or a combination thereof. In certain embodiments, a sulfonic acid may be used. Examples of sulfonic acids include alkyl sulfonic acids such as methane sulfonic acid, ethane sulfonic acid tert-butane sulfonic acid, 2-propane sulfonic acid, and cyclohexyl sulfonic acid; alkene sulfonic acids such as α-olefin sulfonic acid, dimerized α-olefin sulfonic acid, and 2-hexene sulfonic acid; aromatic sulfonic acids such as para-toluene sulfonic acids, benzene sulfonic acid, and naphthalene sulfonic acid; and polymer-supported sulfonic acids such as Amberlyst™ sulfonic acid catalysts available from Dow Chemical.

In certain embodiments, an isocyanate-terminated polyformal prepolymer comprises the reaction products of a polyformal polyol and an aliphatic diisocyanate. Examples of suitable aliphatic diisocyanates for reacting with a polyformal polyol include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4'-methylene dicyclohexyl diisocyanate ($H_{12}$MDI).

In certain embodiments, an isocyanate-terminated polyformal prepolymer comprises the reaction products of a polyformal polyol and an alicyclic diisocyanate. Examples of suitable alicyclic aliphatic diisocyanates for reacting with a polyformal polyol include isophorone diisocyanate (IPDI), cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

In certain embodiments, an isocyanate-terminated polyformal prepolymer comprises the reaction products of a polyformal polyol and an aliphatic diisocyanate selected from IPDI, an HDI trimer, $H_{12}$MDI, and a combination of any of the foregoing. Examples of HDI trimers include, for example, 1,3,5-triazine-2,4,6-(1H,3H,5H)-trione, 1,3,5-tris(6-isocyanatohexyl), Desmodur® N3300, Desmodur® N3368, Desmodur® N3386, Desmodur® N3390, Desmodur® N3600, Desmodur® N3800, Desmodur® XP2731, Desmodur® XP2742, Desmodur® XP2675, and Desmodur® N2714.

In certain embodiments of an isocyanate-terminated polyformal prepolymer of Formula (4) and Formula (5), each $R^5$ is independently selected from a group of Formula (g):

(g)

wherein each $R^{14}$ is a group derived from a diisocyanate.

In certain embodiments of Formula (g), each $R^{14}$ is a group derived from 2,4-diisocyanato-1-methyl-benzene (TDI), Isonate™ 143L (polycarbodiimide-modified diphenylmethane diisocyanate), Desmodur® N3400 (1,3-diazetidine-2,4-dione, 1,3-bis(6-isocyanatohexyl)-), Desmodur® I (isophorone diisocyanate, IPDI), or Desmodur® W ($H_{12}$MDI).

In certain embodiments, compositions provided by the present disclosure comprise an isocyanate-terminated polythioether prepolymer comprising the reaction products of reactants comprising:

(a) a polythioether selected from a polythioether of Formula (23), a polythioether of Formula (24), and a combination thereof:

$$R^{23}-[R^{22}]_a-D-[R^{22}]_a-R^{23} \quad (23)$$

$$B(-D-[R^{22}]_a-R^{23})_z \quad (24)$$

wherein:
D has the structure of Formula (22);

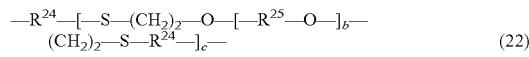

$$-R^{24}-[-S-(CH_2)_2-O-[-R^{25}-O-]_b-(CH_2)_2-S-R^{24}-]_c- \quad (22)$$

wherein:
each $R^{24}$ is independently selected from $C_{2-6}$ alkanediyl, $C_{6-8}$ cycloalkanediyl, $C_{6-10}$ alkanecycloalkanediyl, $-[(CH_2)_s-X-]_q-(CH_2)_r-$, and $-[(CH_2)_s-X-]_q-(CH_2)_r-$ wherein at least one $-CH_2-$ group is substituted with a methyl group;
each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CH_2)_s-X-]_q-(CH_2)_r-$;
each X is independently selected from —O—, —S— and —NR—, wherein R is independently selected from hydrogen and methyl;
each b is independently an integer from 0 to 10;
each c is independently an integer from 1 to 60;
each s is independently an integer from 2 to 6;
each q is independently an integer from 0 to 5; and
each r is independently an integer from 2 to 10;
each a is independently selected from 0 and 1;
each $R^{22}$ is independently —S—$(CH_2)_2$—[O—$R^{25}$]$_b$—O—;
each $R^{23}$ is independently selected from —SH and —S—$(CH_2)_{2+d}$—O—$R^{26}$ when a is 0, or from —$(CH_2)_2$—S—$R^{26}$ when a is 1, wherein:
each d is independently an integer from 0 to 10; and
each $R^{26}$ is independently selected from $C_{1-6}$ alkyl and substituted $C_{1-6}$ alkyl wherein the at least one substituent is selected from —OH and —NHR wherein R is selected from hydrogen and $C_{1-6}$ alkyl;

B is a core of a z-valent polyfunctionalizing agent $B(R)_z$ wherein:

each R is independently selected from a group comprising a group that is reactive with a terminal —SH group and a group comprising a group that is reactive with a terminal —CH=CH$_2$ group; and z is an integer from 3 to 6; and each $R^{30}$ is independently a moiety selected from a moiety derived from a diisocyanate and a moiety derived from an ethylenically unsaturated group; and (b) a diisocyanate.

In certain embodiments, isocyanate-terminated polythioether prepolymers provided by the present disclosure comprise the reaction products of reactants comprising:

(a) a thiol-terminated polythioether comprising the reaction product of reactants comprising:

(i) a dithiol of Formula (17):

wherein:

$R^{15}$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^{17}$)$_s$—X—]$_q$—(CHR$^{17}$)$_r$—; wherein:

each $R^{17}$ is independently selected from hydrogen and methyl;

each X is independently selected from O, S, —NH—, and —NR— wherein R is selected from hydrogen and methyl;

s is an integer from 2 to 6;

q is an integer from 1 to 5; and r is an integer from 2 to 10; and (ii) a divinyl ether of Formula (26):

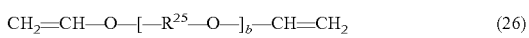

wherein:

each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[(CH$_2$)$_s$—X—]$_q$—(CH$_2$)$_r$—; wherein each X is independently selected from —O—, —S— and —NR—, wherein R is independently selected from hydrogen and methyl;

each s is independently an integer from 2 to 6;

each q is independently an integer from 0 to 5; and each r is independently an integer from 2 to 10; and each b is independently an integer from 0 to 10; and (b) a diisocyanate.

In certain embodiments, isocyanate-terminated polythioether prepolymers provided by the present disclosure comprise the reaction products of reactants comprising:

(a) a thiol-terminated polythioether comprising the reaction product of reactants comprising:

(i) a dithiol of Formula (17):

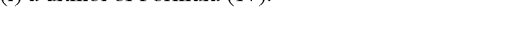

wherein:

$R^{15}$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^{17}$)$_s$—X—]$_q$—(CHR$^{17}$)$_r$—; wherein:

each $R^{17}$ is independently selected from hydrogen and methyl;

each X is independently selected from O, S, —NH—, and —NR— wherein R is selected from hydrogen and methyl;

s is an integer from 2 to 6;

q is an integer from 1 to 5; and r is an integer from 2 to 10; and (ii) a hydroxyl-functional vinyl ether of Formula (27):

wherein:

d is an integer from 0 to 10; and $R^{26}$ is selected from $C_{1-6}$ n-alkyl and substituted $C_{1-6}$ n-alkyl wherein the one or more substituents is selected from —OH and —NHR wherein R is selected from hydrogen and $C_{1-6}$ n-alkyl; and (b) a diisocyanate.

In certain embodiments of a reaction to form an isocyanate-terminated prepolymer, the thiol-terminated-terminated polythioether (a) further comprises a polyfunctionalizing agent $B(R^8)_z$, wherein:

B is a core of a z-valent polyfunctionalizing agent $B(R^8)_z$;

each $R^8$ comprises a group selected from a group that is reactive with a terminal —SH group and a group that is reactive with a terminal —CH=CH$_2$ group; and z is independently selected from an integer from 3 to 6.

In certain embodiments of a reaction to form an isocyanate-terminated prepolymer, the thiol-terminated-terminated polythioether (a) further comprises an alkyl ω-alkenyl ether of Formula (27):

wherein:

d is an integer from 0 to 10; and $R^{26}$ is selected from $C_{1-6}$ alkyl and substituted $C_{1-6}$ alkyl wherein the one or more substituents is selected from —OH and —NHR wherein R is selected from hydrogen and $C_{1-6}$ alkyl.

In certain embodiments, the alkyl ω-alkenyl ether of Formula (27) is 4-hydroxybutyl vinyl ether.

In certain embodiments of a reaction to form an isocyanate-terminated prepolymer, the thiol-terminated-terminated polythioether (a) further comprises a polyfunctionalizing agent $B(R^8)_z$ and an alkyl ω-alkenyl ether of Formula (27).

Suitable isocyanate-functional compounds useful in preparing the isocyanate-terminated polythioether-polyurethanes and/or polythiourethanes utilized in certain embodiments provided by the present disclosure include polymeric and $C_{20}$ linear, branched, cycloaliphatic and aromatic diisocyanates. Examples include diisocyanates having backbone linkages chosen from urethane linkages (—NH—C(O)—O—), thiourethane linkages (—NH—C(O)—S—), thiocarbamate linkages (—NH—C(S)—O—), dithiourethane linkages (—NH—C(S)—S—) and combinations thereof.

The molecular weight of an isocyanate-terminated polythioether prepolymer may vary. In certain embodiments, the number average molecular weight (Mn) of each may be at least 500 grams/mole, or at least 1000 grams/mole, or less than 30,000 grams/mole, or less than 15,000 grams/mole. The number average molecular weight may be determined using known methods. The number average molecular weight values recited herein may be determined by gel permeation chromatography (GPC) using polystyrene standards.

Examples of suitable diisocyanates, include aliphatic diisocyanates, cycloaliphatic diisocyanates wherein one or more of the isocyanato groups are attached directly to the cycloaliphatic ring, cycloaliphatic diisocyanates wherein one or more of the isocyanato groups are not attached directly to the cycloaliphatic ring, aromatic diisocyanates wherein one or more of the isocyanato groups are attached directly to the aromatic ring, and aromatic diisocyanates wherein one or more of the isocyanato groups are not attached directly to the aromatic ring. In certain embodiments, the diisocyanate does not comprise an aliphatic diisocyanate.

In certain embodiments, the polyisocyanate includes, for example, aliphatic or cycloaliphatic diisocyanates, aromatic diisocyanates, cyclic dimers and cyclic trimers thereof, and mixtures thereof. Non-limiting examples of suitable polyisocyanates include, but are not limited to, Desmodur® N 3300 (hexamethylene diisocyanate trimer) and Desmodur® N 3400 (60% hexamethylene diisocyanate dimer and 40% hexamethylene diisocyanate trimer), which are commercially available from Bayer.

Other suitable diisocyanates are disclosed herein and, for example, in U.S. Pat. No. 7,879,955.

In certain embodiments, isocyanate-terminated prepolymers provided by the present disclosure are liquid at room temperature. In certain embodiments, the prepolymers have a viscosity, at 100% solids, of no more than about 900 poise, such as from about 10 to about 300 poise, and in certain embodiments from about 100 to about 200 poise, at a temperature of about 25° C. and a pressure of about 760 mm Hg determined according to ASTM D-2849 §79-90 using a Brookfield CAP 2000 viscometer.

In certain embodiments, compositions provided by the present disclosure comprise the reaction products of reactants comprising:

(a) an isocyanate-terminated prepolymer selected from an isocyanate-terminated polyformal prepolymer and an isocyanate-terminated polythioether prepolymer; and
(b) a polyamine of Formula (1):

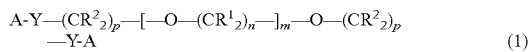

$$A\text{-}Y\text{—}(CR^2{}_2)_p\text{—}[\text{—}O\text{—}(CR^1{}_2)_n\text{—}]_m\text{—}O\text{—}(CR^2{}_2)_p\text{—}Y\text{-}A \quad (1)$$

wherein:
m is an integer from 0 to 4;
each n is independently an integer from 1 to 4;
each p is independently an integer from 1 to 4;
each A is independently amino-substituted phenyl;
each Y is independently selected from O and S;
each $R^1$ is independently selected from hydrogen and $C_{1-3}$ alkyl; and
each $R^2$ is independently selected from hydrogen and $C_{1-3}$ alkyl.

In certain embodiments, an isocyanate-terminated prepolymer includes any of the isocyanate-terminated polyformal prepolymers and/or any of the isocyanate-terminated polythioether prepolymers disclosed herein.

In certain embodiments, compositions provided by the present disclosure further comprise in addition to an flexible amine-terminated adduct and/or flexible polyamine provided by the present disclosure, one or more aromatic amines such as, for example, m-xylenediamine, xylylene diamine, xylylenediamine trimer, metaphenylene diamine, diaminodiphenylmethane, diaminodiphenylsulfone, diethyltoluene diamine, diethylthiotoluene diamine, and a combination of any of the foregoing. In certain embodiments, an aromatic amine is selected from diethyltoluene diamine, diethylthiotoluene diamine, and a combination thereof. In certain embodiments, an amine curing agent comprises an aromatic diamine such as, for example, dimethylthiotoluenediamine, diethyltoluenediamine, or a combination thereof. In certain embodiments, an aromatic diamine comprises dimethylthiotoluenediamine such as Ethacure® 300, which comprises 95%-97% dimethylthiotoluene diamine, 2%-3% monomethylthiotoluene diamine, where the dimethylthiotoluene diamine comprises a combination of the 3,5-dimethylthio-2, 6-toluene diamine, and 3,5-dimethylthio-2,4-toluene diamine as the major isomer. In certain embodiments, an aromatic diamine comprises diethylthiotoluenediamine such as Ethacure® 100, which comprises 75%-81% diethyltoluene-2,4-diamine and 18%-20% 3,5-diethyltoluene-2,6-diamine. In certain embodiments, the composition comprises a molar equivalent excess of isocyanate to amine, such as, for example, a molar equivalent excess from 1.01 to 1.2, from 1.02 to 1.1, from 1.02 to 1.08, from 1.03 to 1.07, and in certain embodiments, 1.05.

Compositions provided by the present disclosure may comprise one or more different types of filler. Suitable fillers include those commonly known in the art, including inorganic fillers, such as carbon black and calcium carbonate ($CaCO_3$), and lightweight fillers. Suitable lightweight fillers include, for example, those described in U.S. Pat. No. 6,525, 168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition.

As can be appreciated, amine-terminated adducts, isocyanate-terminated prepolymers, flexible polyamines, and fillers employed in a composition, as well as any additives, may be selected so as to be compatible with each other.

Compositions provided by the present disclosure may include one or more colorants, thixotropic agents, accelerators, retardants, adhesion promoters, solvents, masking agents, or a combination of any of the foregoing.

As used herein, the term "colorant" means any substance that imparts color and/or other opacity and/or other visual effect to the composition. A colorant can be of any suitable form, such as discrete particles, dispersions, solutions, and/or flakes. A single colorant or a combination of two or more colorants can be used in a composition.

Examples of colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into a composition by use of a grind vehicle, such as an acrylic grind vehicle. Examples of pigments and/or pigment compositions include carbazole dioxazine crude pigment, azo, monoazo, diazo, naphthol AS, salt type (flakes), benzimidazolone, isoindolinone, isoindoline, polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red (DPPBO red), titanium dioxide, carbon black, and combinations of any of the foregoing. Examples of dyes include those that are solvent- and/ or aqueous-based such as phthalo green or blue, iron oxide, bismuth vanadate, anthraquinone, perylene, and quinacridone. Examples of tints include pigments dispersed in water-based or water-miscible carriers such as AquaChem® 896 (available from Degussa, Inc.), CHARISMA COLORANTS and MAXITONER INDUSTRIAL COLORANTS (available from Accurate Dispersions division of Eastman Chemical, Inc.).

As noted above, a colorant may be in the form of a dispersion including, for example, a nanoparticle dispersion. Nanoparticle dispersions may include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Examples of nanoparticle dispersions and methods for making them are disclosed in U.S. Pat. No. 6,875,800. Nanoparticle dispersions may also be produced by crystallization, precipitation, gas phase condensation, and/or chemical attrition (i.e., partial dissolution). To minimize re-agglomeration of nanoparticles within the coating, a dispersion of resin-coated nanoparticles may be used. As used herein, a "dispersion of resin-coated nanoparticles" refers to a continuous phase in which are dispersed discreet "composite microparticles" that comprise a nanoparticle and a resin coating on the nanoparticle. Examples of dispersions containing resin-coated nanoparticles and methods for making them are disclosed in U.S. Pat. No. 7,438,972.

Examples of special-effect compositions that may be used in compositions provided by the present disclosure include pigments and/or compositions that produce one or more appearance effects such as reflectance, pearlescence, metallic sheen, phosphorescence, fluorescence, photochromism, photosensitivity, thermochromism, goniochromism, and/or color-change. Additional special-effect compositions can provide other perceivable properties, such as opacity or texture. In certain embodiments, special-effect compositions may produce a color shift, such that the color of a composition changes when the coating is viewed at different angles. Examples of color-effect compositions are disclosed in U.S. Pat. No. 6,894,086. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air. In general, a colorant may comprise from 1 wt % to 65 wt % of a composition, from 2 wt % to 50 wt %, such as from 3 wt % to 40 wt %, or from 5 wt % to 35 wt %, with weight percent based on the total dry weight of the composition.

Thixotropes, for example, silica, may be used in an amount from 0.1 wt % to 5 wt %, based on the total dry weight of the composition.

Accelerants may be present in an amount from 0.1 to 5 weight percent, based on the total weight of the composition. Examples of suitable accelerants include 1,4-diaza-bicyclo[2.2.2]octane (DABCO®, Air Products, Chemical Additives Division) and DMP-30® (an accelerant composition including 2,4,6-tris(dimethylaminomethyl)phenol).

Adhesion promoters may be present in amount from 0.1 wt % to 15 wt % of a composition, based on the total dry weight of the composition. Examples of adhesion promoters include phenolics, such as Methylon® phenolic resin (available from Occidental Chemicals), and organosilanes, such as epoxy, mercapto or amino functional silanes, such as Silquest® A-187 and Silquest® A-1100 (available from Momentive Performance Materials).

Masking agents, such as pine fragrance or other scents, which may be useful in masking any low level odor of the composition, may be present in an amount from 0.1 wt % to 1 wt %, based on the total dry weight of the composition.

In certain embodiments, compositions provided by the present disclosure may comprise a plasticizer that may facilitate the use of prepolymers having a higher glass transition temperature, $T_g$, than would ordinarily be useful in an aerospace sealant. For example, use of a plasticizer may effectively reduce the $T_g$ of a composition, and thereby increase the low-temperature flexibility of the cured polymerizable composition beyond that which would be expected on the basis of the $T_g$ of the prepolymers alone. Plasticizers suitable in certain embodiments of the compositions include, for example, phthalate esters, chlorinated paraffins, and hydrogenated terphenyls. A plasticizer or combination of plasticizers may constitute from 1 wt % to 40 wt % of a composition, or from 1 wt % to 10 wt % of a composition. In certain embodiments, a composition may comprise one or more organic solvents, such as isopropyl alcohol, in an amount, for example, from 0 wt % to 15 wt %, from 0 wt % to 10 wt %, or from 0 wt % to 5 wt %, based on the non-dry weight of the composition.

In certain embodiments, compositions provided by the present disclosure comprise one or more additional sulfur-containing polymers. A sulfur-containing polymer can be any polymer having at least one sulfur atom in the repeating unit, including polymeric thiols, polythiols, thioethers, polythioethers, polyformals, and polysulfides. A "thiol," as used herein, refers to a compound comprising a thiol or mercaptan group, that is, an —SH group, either as the sole functional group or in combination with other functional groups, such as hydroxyl groups, as is the case with, for example, thioglycerols. A polythiol refers to such a compound having more than one —SH group, such as a dithiol or higher functionality thiol. Such groups are typically terminal and/or pendant such that they have a active hydrogen that is reactive with other functional groups. As used herein, the term "polysulfide" refers to any compound that comprises a sulfur-sulfur linkage (—S—S—). A polythiol can comprise both a terminal and/or pendant sulfur (—SH) and a non-reactive sulfur atom (—S— or —S—S—). Thus, the term polythiol generally encompasses polythioethers and polysulfides. Examples of additional sulfur-containing polymers suitable in compositions provided by the present disclosure include, for example, those disclosed in U.S. Pat. Nos. 6,172,179, 6,509,418, 7,009,032, 7,879,955.

In certain embodiments, compositions provided by the present disclosure comprise a polythioether having the structure:

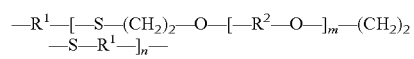

wherein $R^1$ is selected from a $C_{2-6}$ alkanediyl, $C_{6-8}$ cycloalkanediyl, $C_{6-10}$ cycloalkylalkanediyl, —[(—CH$_2$—)$_p$—X—]$_q$—(—CH$_2$—)$_r$—, and —[(—CH$_2$—)$_p$—X—]$_q$—(—CH$_2$—)$_r$— in which at least one —CH$_2$— unit is substituted with a methyl group; $R^2$ is selected from $C_{2-6}$ alkanediyl, $C_{6-8}$ cycloalkanediyl, $C_{6-10}$ cycloalkylalkanediyl, and —[(—CH$_2$—)$_p$—X—]$_q$—(—CH$_2$—)$_r$—; X is selected from O, S, and —NR$^6$—, where R$^6$ is selected from hydrogen and methyl; m is an integer selected from 0 to 10; n is an integer selected from 1 to 60; p is an integer selected from 2 to 6; q is an integer selected from 1 to 5, and r is an integer selected from 2 to 10. Such polythioethers are described in U.S. Pat. No. 6,172,179. The one or more additional sulfur-containing polymers may be difunctional or multifunctional, for example, having from 3 to 6 terminal groups, or a mixture thereof. In certain embodiments, such additional sulfur-containing polymers are amine-terminated.

In certain embodiments, compositions provided by the present disclosure comprise from 10 wt % to 90 wt % of a flexible amine-terminated, sulfur-containing polymer provided by the present disclosure, from 20 wt % to 80 wt %, from 30 wt % to 70 wt %, and in certain embodiments from 40 wt % to 60 wt %, where wt % is based on the total weight of all non-volatile components of the composition (i.e., the dry weight). In certain embodiments, compositions provided by the present disclosure comprise from 10 wt % to 90 wt % of a flexible amine-terminated, sulfur-containing polymer provided by the present disclosure, from 20 wt % to 90 wt %, from 30 wt % to 90 wt %, from 40 wt % to 90 wt %, from 50 wt % to 90 wt %, from 60 wt % to 90 wt %, from 70 wt % to 90 wt %, and in certain embodiments from 80 wt % to 90 wt %, where wt % is based on the total weight of all non-volatile components of the composition (i.e., the dry weight).

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. Suitable fillers for decreasing the specific gravity of the composition include, for example, hollow microspheres such as Expancel® microspheres (available from AkzoNobel) or Dualite® low density polymer microspheres (available from Henkel).

In certain embodiments, compositions provided by the present disclosure comprise one or more curing agent. Curing agents suitable in compositions provided by the present disclosure include compounds that are reactive with the terminal amine groups of the sulfur-containing adducts disclosed herein, such as isocyanates. Examples of suitable curing agents that are reactive with amine groups include polymeric polyisocyanates, non-limiting examples of which include in addition to the isocyanate-terminated prepolymers disclosed herein, polyisocyanates having backbone groups chosen from urethane groups (—NH—C(O)—O—), thiourethane groups (—NH—C(O)—S—), thiocarbamate groups (—NH—C(S)—O—), dithiourethane linkages (—NH—C(S)—S—), and combinations of any of the foregoing.

In certain embodiments, compositions provided by the present disclosure are substantially free or, in some cases, completely free, of any solvent, such as an organic solvent or an aqueous solvent, i.e., water. Stated differently, in certain embodiments, compositions provided by the present disclosure are substantially 100% solids.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wetability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more flexible amine-terminated adducts and/or one or more flexible polyamines provided by the present disclosure and a second package comprises one or more curing agents for the one or more amine-terminated adducts and/or one or more flexible polyamines such as one or more isocyanate-terminated prepolymers provided by the present disclosure. Additives and/or other materials may be added to either package as desired or necessary. The two packages may be combined and mixed prior to use. In certain embodiments, the pot life of the one or more mixed prepolymers and curing agent is at least 30 minutes, at least 1 hour, at least 2 hours, and in certain embodiments, more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Compositions provided by the present disclosure may be applied directly onto the surface of a substrate or over an underlayer by any suitable coating process known to those of ordinary skill in the art.

In certain embodiments, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provide a cured product, such as a sealant, exhibiting an elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi and in some cases at least 400 psi when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% RH to 100% RH. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation such as ultraviolet radiation. As will also be appreciated, the methods may be used to seal apertures on aerospace vehicles including aircraft and aerospace vehicles.

Embodiments provided by the present disclosure are further illustrated by reference to the following examples, which describe the synthesis, properties, and uses of certain flexible polyamines, amine-terminated adducts, isocyanate-terminated prepolymers, and compositions comprising flexible polyamines, amine-terminated adducts, and isocyanate-terminated prepolymers. It will be apparent to those skilled in the art that many modifications, both to materials, and methods, may be practiced without departing from the scope of the disclosure.

EXAMPLE 1

Polyformal Polyol

Thiodiglycol (1,833 g), paraformaldehyde (95% purity) (360 g), Amberlyst™ 15 (319 g, available from Dow Chemical Company), and toluene (1,000 mL) were charged into a 5-L, 4-neck, round-bottom flask. The flask was equipped with a heating mantle, thermocouple, temperature controller, and a Dean-Stark adapter fitted with a reflux condenser, dropping funnel, and an inlet for nitrogen positive pressure. The reactants were stirred under nitrogen, heated to 118° C., and maintained at 118° C. for ca. 7 h. During this period, collected water was periodically removed from the Dean-Stark adapter. The reaction mixture was then cooled to room temperature and filtered through a coarse-fitted Buchner funnel (600 mL volume) with a 9.0 cm diameter Whatman GF/A filter paper over the frit. The flask and filter cake were washed with 500 mL toluene. A filtrate was obtained. The filtrate was then dried in vacuo using a 2-L round bottomed flask (rotary evaporator, 7 torr final vacuum, 90° C. water bath) to provide a yellow, viscous polymer (1,456 g). The resulting thiodiglycol polyformal polyol had a hydroxyl number of 34.5 and a viscosity of 92 poise.

EXAMPLE 2

$H_{12}$MDI-Terminated Polyformal-Isocyanate Prepolymer

The thiodiglycol polyformal polyol of Example 1 (450 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® W ($H_{12}$MDI) (99.5 g) and a 0.01% solution of dibutyltin dilaurate dissolved in methyl ethyl ketone (5.50 g). The reaction mixture was maintained at 76.6° C. for 7 h and then cooled to room temperature. A 1% solution of benzoyl chloride dissolved in methyl ethyl ketone (5.50 g) was then added to the reaction mixture. The resulting thiodiglycol polyformal-isocyanate prepolymer had an isocyanate content of 3.73% and a viscosity of 356 poise.

EXAMPLE 3

HDI-Uretidione-Terminated Polyformal-Isocyanate Prepolymer

The thiodiglycol polyformal polyol of Example 1 (101 g) was charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® XP-2730 (HDI-uretidione aliphatic polyisocyanate) (33.4 g) and a 0.01% solution of dibutyltin dilaurate dissolved in methyl ethyl ketone (1.4 g). The reaction mixture was maintained at 76.6° C. for ca. 7 h and then cooled to room temperature. A 1% solution of benzoyl chloride dissolved in methyl ethyl ketone (1.4 g) was then added to the reaction mixture. The resulting prepolymer had an isocyanate content of 3.41% and a viscosity of 695 poise.

EXAMPLE 4

HDI-Uretidione-Terminated Polyformal-Isocyanate Prepolymer

The thiodiglycol polyformal polyol of Example 1 (400 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® N-3400 (137 g) and a 0.01% solution of dibutyltin dilaurate dissolved in methyl ethyl ketone (5.50 g). The reaction mixture was maintained at 76.6° C. for ca. 7 h and then cooled to room temperature. A 1% solution of benzyl chloride dissolved in methyl ethyl ketone (5.5 g) was then added to the reaction mixture. The resulting thiodiglycol polyformal-isocyanate prepolymer had an isocyanate content of 3.31% and a viscosity of 697 poise.

EXAMPLE 5

HDI-Uretidione-Terminated Polyformal-Isocyanate Prepolymer

The thiodiglycol polyformal polyol of Example 1 (504 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® N-3400 (521 g) and a 0.01% solution of dibutyltin dilaurate dissolved in methyl ethyl ketone (10.3 g). The reaction mixture was maintained at 76.6° C. for ca. 7 h and then cooled to room temperature. A 1% solution of benzyl chloride dissolved in methyl ethyl ketone (10.4 g) was then added to the reaction mixture. The resulting thiodiglycol polyformal-isocyanate prepolymer had an isocyanate content of 8.94% and a viscosity of 46 poise.

EXAMPLE 6

Isophorone-Terminated Polyformal-Isocyanate Prepolymer

The thiodiglycol polyformal polyol of Example 1 (325 g) was charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® I (62.5 g) (IPDI) and a 0.01% solution of dibutyltin dilaurate dissolved in methyl ethyl ketone (4 g). The reaction mixture was maintained at 76.6° C. for ca. 7 h and then cooled to room temperature. A 1% solution of benzyl chloride dissolved in methyl ethyl ketone (4 g) was then added to the reaction mixture. The resulting thiodiglycol polyformal-isocyanate prepolymer had an isocyanate content of 3.51% and a viscosity of 229 poise.

EXAMPLE 7

$H_{12}$MDI-Terminated Polythioether-Isocyanate Prepolymer

A thiol-terminated polythioether was prepared according to Example 1 of U.S. Pat. No. 6,172,179. In a 2-L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (VAZO®67, 2,2'-azobis(2-methylbutyronitrile)). The reaction proceeded substantially to completion after 2 to afford 1,250 g (0.39 mol, yield 100%) of a liquid thiol-terminated polythioether resin having a $T_g$ of –68° C. and a viscosity of 65 poise. The resin was faintly yellow and had low odor.

A 1-liter, 4-neck round-bottomed flask was fitted with a mantle, thermocouple, temperature controller, nitrogen line, mechanical stirrer and dropping funnel. The flask was charged with a thiol-terminated polythioether (652.30 g) prepared according to Example 1 of U.S. Pat. No. 6,172,179. The flask was heated to 71° C. under nitrogen and stirred at 300 rpm. A mixture of 4-hydroxybutyl vinyl ether (47.40 g) and Vazo-67 (1.19 g) was added to the flask in 1 h via a dropping funnel. The reaction mixture was maintained at 71° C. for ca. 41 h, at which time the reaction was complete. After this, the reaction apparatus was then fitted with a vacuum line and the product heated to 94° C. Heating was continued for 1.3 h under vacuum. Following vacuum treatment, a pale yellow, viscous polythioether polyol (678.80 g) was obtained. The polythioether polyol had a hydroxyl number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C. (170° F.), followed by the addition of Desmodur® W ($H_{12}$MDI) (82.90 g) and a 0.01% solution of dibutyltin dilaurate dissolved in methyl ethyl ketone (3.90 g). The reaction mixture was maintained at 76.6° C. for ca. 7 h and then cooled to room temperature. A 1% solution of benzoyl chloride dissolved in methyl ethyl ketone (3.80 g) was then added to the reaction mixture. The resulting $H_{12}$MDI-terminated polythioether prepolymer had an isocyanate content of 4.47% and a viscosity of 282 poise.

EXAMPLE 8

Acrylate-Terminated Polyformal Polymer

The sulfur-containing polymer of Example 1 (164.3 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (10.1 g) and a 0.01% solution of dibutyltin dilaurate dissolved in methyl ethyl ketone (1.7 g). The reaction mixture was maintained at 76.6° C. for 5 h and then cooled to room temperature. A 1% solution of benzoyl chloride dissolved in methyl ethyl ketone (1.8 g) was then added to the reaction mixture. The resulting polymer had a viscosity of 177 poise.

EXAMPLE 9

Allyl-Terminated Polyformal Polymer

The sulfur-containing polymer in Example 1 (143.1 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of allyl isocyanate (4.8 g) and a 0.01% solution of dibutyltin dilaurate dissolved in methyl ethyl ketone (1.5 g). The reaction mixture was maintained at 76.6° C. for 5 h and then cooled to room temperature. The resulting polymer had a viscosity of 176 poise.

EXAMPLE 10

TMI-Terminated Polyformal Polymer

The sulfur-containing polymer in Example 1 (150.9 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of 3-isopropenyl-α,α-dimethylbenzyl isocyanate (12.7 g, available from Cytec Industries) and a 0.01% solution of dibutyltin dilaurate dissolved in methyl ethyl ketone (1.63 g). The reaction mixture was maintained at 76.6° C. for 6 h and then cooled to room temperature. The resulting polymer had a viscosity of 291 poise.

EXAMPLE 11

Synthesis of Trifunctional Polyformal Polyol

Thiodiglycol (1,215.81 g), paraformaldehyde (95% purity) (300.63 g), Amberlyst™ 15 (212.80 g, Dow Chemical Company), 1,3,5-tris(2-hydroxyethyl)isocyanurate (13.14 g, Aldrich), and toluene (500 mL) were charged in a 3-liter, 4-neck round-bottom flask. The flask was equipped with a heating mantle, thermocouple, temperature controller, and a Dean-Stark adapter fitted with a reflux condenser, a dropping funnel and an inlet for nitrogen positive pressure. During this period, collected water was periodically removed from the Dean-Stark adapter. Stirring was started under nitrogen and the batch was heated to 120° C. and maintained at 120° C. for about 10 h. The reaction mixture was then cooled to room temperature and filtered with suction through a coarse-fitted Buchner funnel (600 mL volume) with a 9.0 cm-diameter Whatman GF/A filter paper over the frit. The flask and filter cake were washed with 500 mL toluene. A filtrate was obtained. The filtrate was then stripped in vacuo using a 2-L round bottomed flask (rotary evaporator, 5 torr final vacuum, 90° C. water bath). A yellow, viscous polymer (993.53 g) was obtained. The resulting polyformal polymer had a hydroxyl number of 25.3 and a viscosity of 214 poise.

EXAMPLE 12

Synthesis of Trifunctional Polyformal Polyol

Thiodiglycol (1.209.67 g), paraformaldehyde (95% purity) (300.48 g), Amberlyst™ 15 (26.18 g, Dow Chemical Company), 1,3,5-tris(2-hydroxyethyl)isocyanurate (20.9 g, Aldrich), and toluene (500 mL) were charged in a 3-liter, 4-neck round-bottom flask. The flask was equipped with a heating mantle, thermocouple, temperature controller, and a Dean-Stark adapter fitted with a reflux condenser, a dropping funnel and an inlet for nitrogen positive pressure. During this period, collected water was periodically removed from the Dean-Stark adapter. Stirring was started under nitrogen and the batch was heated to 120° C. and maintained at 120° C. for about 10 h. The reaction mixture was then cooled to room temperature and filtered with suction through a coarse-fitted Buchner funnel (600 mL volume) with a 9.0 cm diameter Whatman GF/A filter paper over the frit. The flask and filter cake were washed with 500 mL toluene. A filtrate was obtained. The filtrate was then stripped in vacuo using a 2-L round bottomed flask (rotary evaporator, 5 torr final vacuum, 90° C. water bath). A yellow, viscous polymer (953.33 g) was obtained. The resulting polyformal polymer had a hydroxyl number of 22.8 and a viscosity of 377 poise.

EXAMPLE 13

Synthesis of Trifunctional Polyformal Polyol

Thiodiglycol (1,197.45 g), paraformaldehyde (95% purity) (300.83 g), AMBERLYST™ 15 (213.06 g, Dow Chemical Company), 1,3,5-tris(2-hydroxyethyl) isocyanurate (52.58 g, Aldrich) and toluene (500 mL) were charged in a 3-liter, 4-neck round-bottom flask. The flask was equipped with a heating mantle, thermocouple, temperature controller, and a Dean-Stark adapter fitted with a reflux condenser, a dropping funnel and an inlet for nitrogen positive pressure. During this period, collected water was periodically removed from the Dean-Stark adapter. Stirring was started under nitrogen and the batch was heated to 120° C. and maintained at 120° C. for about 10 h. The reaction mixture was then cooled to room temperature and filtered with suction through a coarse-fitted Buchner funnel (600 mL volume) with a 9.0 cm-diameter Whatman GF/A filter paper over the frit. The flask and filter cake were washed with 500 mL toluene. A filtrate was obtained. The filtrate was then stripped in vacuo using a 2-L round bottomed flask (rotary evaporator, 5 ton final vacuum, 90° C. water bath). A yellow, viscous polymer (1,039.64 g) was obtained. The resulting polyformal polymer had a hydroxyl number of 23.2 and a viscosity of 942 poise.

EXAMPLE 14

Acrylate-Terminated Trifunctional Polyformal Polyol

The polyformal polymer of Example 11 (222.40 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (15.68 g) and a 0.05% solution of dibutyltin dilaurate dissolved in methyl ethyl ketone (2.51 g). The reaction mixture was maintained at 76.6° C. for 5 h and then cooled to room temperature. The resulting acrylate-terminated polymer (222.08 g) had a viscosity of 299 poise.

EXAMPLE 15

Acrylate-Terminated Trifunctional Polyformal Polyol

The polyformal polymer of Example 12 (247.26 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (15.61 g) and a 0.05% solution of dibutyltin dilaurate dissolved in methyl ethyl ketone (2.66 g). The reaction mixture was maintained at 76.6° C. for 5 h and then cooled to room temperature. The resulting acrylate-terminated polymer (242.14 g) had a viscosity of 439 poise.

EXAMPLE 16

Acrylate-Terminated Trifunctional Polyformal Polyol

The polyformal polymer of Example 13 (243.71 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (15.58 g) and a 0.05% solution of dibutyltin dilaurate dissolved in methyl ethyl ketone (2.74 g). The reaction mixture was maintained at 76.6° C. for 5 h and then cooled to room temperature. The resulting acrylate-terminated polymer (226.09 g) had a viscosity of 1,026 poise.

EXAMPLE 17

TMI-Terminated Trifunctional Polyformal Polyol

The polyformal polymer in Example 11 (222.6 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of 3-isopropenyl-α,α,-dimethylbenzyl isocyanate (TMI) (20.25 g, Cytec Industries) and a 0.05% solution of dibutyltin dilaurate dissolved in methyl ethyl ketone (2.47 g). The reaction mixture was maintained at 76.6° C. for 6 h and then cooled to room temperature. The resulting TMI-terminated polymer (217.32) had a viscosity of 378 poise.

EXAMPLE 18

TMI-Terminated Trifunctional Polyformal Polyol

The polyformal polymer in Example 11 (243.70 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of 3-isopropenyl-α,α,-dimethylbenzyl isocyanate (20.18 g, Cytec Industries) and a 0.05% solution of dibutyltin dilaurate dissolved in methyl ethyl ketone (2.62 g). The reaction mixture was maintained at 76.6° C. for 6 h and then cooled to room temperature. The resulting TMI-terminated polymer (230.42 g) had a viscosity of 1.261 poise.

EXAMPLE 19

Preparation of 2,2'-(2,2'-methylenebis(oxy)bis(ethane-2,1-diyl)bis(sulfanediyl))dianiline A 1-liter, 4-necked, round bottomed flask was fitted with a mantle, mechanical stirrer (PTFE paddle and bearing), thermocouple, temperature controller, reflux condenser topped with a nitrogen line, and a dropping funnel. The flask was charged with 31.02 g of KOH followed by 200 mL of isopropanol. The mixture was stirred at ca. 300 rpm under nitrogen until the KOH dissolved in the isopropanol. 62.67 g of 2-aminothiophenol was then added drop-wise over 0.38 h. The temperature rose from 28° C. to a peak of 49.4° C. Initially the solution was a pink color and turned yellow at the end of addition. After stirring for 8 minutes, 43.26 g of bis-2-chloroethyl formal was added over 0.18 h (11 min). Almost immediately, the reaction mixture turned cloudy and as the addition progressed, a thick, white precipitate began to come out of solution. The suspension was stirred for an additional 0.85 h, a warmed to 80° C., and kept at this temperature for 3.6 h. The suspension was then cooled to room temperature. The suspension was diluted with 300 mL isopropanol and filtered with suction through Whatman GF/A paper to afford a yellow filtrate. This was condensed under reduced pressure (rotary evaporator, 90° C. water bath, 1 torr final vacuum) to provide 67.26 g (76.7% yield) of a yellow oil.

EXAMPLE 20

Preparation of 4,4'-(2,2'-methylenebis(oxy)bis(ethane-2,1-diyl)bis(oxy))dianiline A 4-necked, 1-liter flask was fitted with a reflux condenser, nitrogen line, mechanical stirrer (PTFE bearing and paddle), thermocouple, pressure-equilibrated dropping funnel and a mantle. The flask was charged with 500 mL of ethanol followed by 59.04 g of potassium hydroxide. The mixture was stirred under nitrogen at ca. 300 rpm until the KOH was partially dissolved. 109.18 g of 4-aminophenol was then added over 2 min. This was accompanied by an endotherm. 86.52 g bis-2-chloroethyl formal was then added over ca. 0.5 h. The resultant dark suspension was heated at 80° C. for 11.6 h. The dark-colored reaction product was filtered with suction through Whatman GF/A paper and the filter cake was washed with 300 mL ethanol. The dark brown filtrate was then stripped in vacuo (rotary evaporator, 6 torr final vacuum, 90° C. water bath) to afford 168.80 g of a dark brown solid. This corresponded to a yield in excess of theory, so the material was presumed to include solvent and/or KCl impurities. The crude product in the flask was dissolved in 250 mL hot ethanol in order to recrystallize it. No crystals had formed, so the solution volume was reduced on the hot plate from 550 mL volume to 400 mL volume. The recrystallization flask was now filled with solids indicating that the recrystallization was successful. The crystals were isolated by suction filtration using Whatman GF/A paper. The dark brown filter cake was washed with 100 mL ethanol and 50 mL isopropanol. The filter cake was then stripped of solvent in vacuo (rotary evaporator, 9 torr final vacuum, 50° C. water bath) to provide 64.73 g (40.7% yield) of a sticky, dark brown solid.

EXAMPLE 21

Preparation of 4,4'-(2,2'-methylenebis(oxy)bis(ethane-2,1-diyl)bis(sulfanediyl))dianiline A 4-necked, 1-liter flask was fitted with a reflux condenser, nitrogen line, mechanical stirrer (PTFE bearing and paddle), thermocouple, pressure-equilibrated dropping funnel, and a mantle. The flask was charged with 200 mL of isopropyl alcohol followed by 23.17 g of potassium hydroxide. The mixture was stirred under nitrogen at ca. 300 rpm until the KOH was partially dissolved. 41.96 g of 4-aminothiophenol was then added over 4 min. This was accompanied by an exotherm and resulted in a suspension of the potassium salt. 34.09 g of bis-2-chloroethyl formal was then added over ca. 0.5 h. The resultant suspension was heated at 80° C. for 7.8 h. The resulting reaction product was a mixture of solids and a yellow liquid. The reaction product was filtered with suction through Whatman GF/A paper to afford a yellow filtrate and a white filter cake, which was washed on the filter with 500 mL tetrahydrofuran (THF). The filter cake weighed 25.64 g. The filtrate was condensed under reduced pressure (rotary evaporator, 90° C. water bath, 9 torr) to provide 64.74 g (93.7% yield) of a viscous, yellow oil.

EXAMPLE 22

Preparation of 2,2'-(ethane-1,2-diylbis(sulfanediyl))dianiline

A 4-necked, 1-L flask was fitted with a reflux condenser, nitrogen line, mechanical stirrer (PTFE bearing and paddle), thermocouple, pressure-equilibrated dropping funnel, and a mantle. The flask was charged with 300 mL of isopropyl alcohol followed by 42.0 g of potassium hydroxide. The mixture was stirred under nitrogen at ca. 300 rpm until the KOH was partially dissolved. 88.86 g of 2-aminothiophenol was then added over 1.25 r. This was accompanied by an exotherm and the formation of a suspension of the potassium salt. 99.71 g of 1,2-diiodoethane suspended in 200 mL isopropanol at 50° C. was then added over ca. 0.25 hr. The resultant suspension was heated at 80° C. for 8.9 h. The reaction mixture was filtered hot through Whatman GF/A paper. The filter cake was washed with 100 mL isopropanol. The weight of the filter cake was 95.25 g. The filtrate crystallized while cooling overnight to room temperature. The crystals were isolated by suction filtration through Whatman #1 paper. The yellow crystals were dried on a rotary evaporator (1 torr final vacuum, 90° C. water bath) to afford 57.32 g (58.5%) of a yellow solid.

EXAMPLE 23

Preparation of 2,2'-methylenebis(sulfanediyl)dianiline

A 1-L 4-necked, round bottomed flask was fitted with a mechanical stirrer (PTFE bearing and paddle), reflux condenser, nitrogen line, thermocouple, mantle, and a pressure equilibrated dropping funnel. The flask was charged with 300 mL of isopropanol, and then 29.83 g of potassium hydroxide was added. Stirring under nitrogen at ca. 300 rpm was started. The KOH partially dissolved. Then 63.39 g of 2-aminothiophenol was added drop-wise over 1.2 h. This caused an exotherm and solids precipitated out. An additional 200 mL isopropanol was added to aid in stirring, then 44.02 g of dibromomethane was added drop-wise over 6 min (0.1 h). This also was accompanied with an exotherm. The reaction mixture was then warmed to 80° C. and kept at 80° C. for 12.7 h. The reaction mixture was filtered hot through Whatman GF/A paper with suction and the white filter cake washed with isopropanol. The yellow filtrate was stripped in vacuo (rotary evaporator, 90° C. water bath, 2 ton final vacuum) to provide 64.63 g (97.3% yield) of an orange oil.

EXAMPLE 24

Synthesis of Flexible Amine-Terminated Polythioether Adduct

In a 2-L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (VAZO®67, 2,2'-azobis(2-methylbutyronitrile)). The reaction proceeded substantially to completion after 2 h to afford 1,250 g (0.39 mol, 100% yield) of a liquid thiol-terminated polythioether resin having a $T_g$ of −68° C. and a viscosity of 65 poise. The resin was faintly yellow and had low odor.

A 1-liter, 4-neck round-bottomed flask was fitted with a mantle, thermocouple, temperature controller, nitrogen line, mechanical stirrer and dropping funnel. The flask was charged with a thiol-terminated polythioether (652.30 g) prepared according to Example 1 of U.S. Pat. No. 6,172,179 (see previous paragraph). The flask was heated to 71° C. under nitrogen and stirred at 300 rpm. A mixture of 4-hydroxybutyl

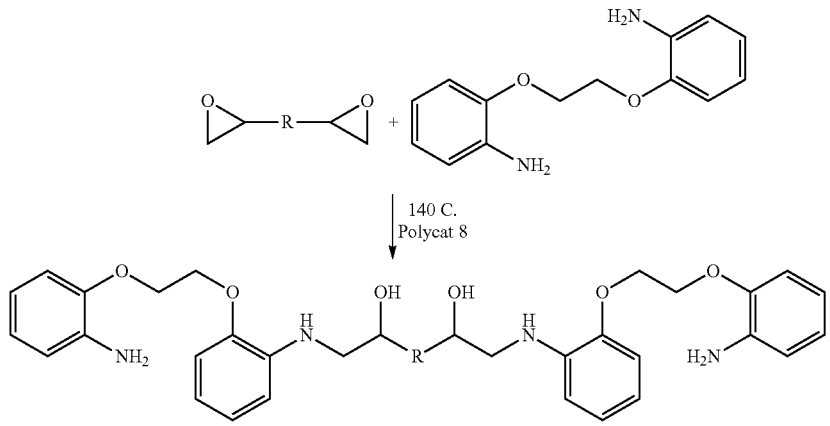

A 4-neck, 3-liter flask was charged with 72.02 g of Permapol® L-5534 (PRC-Desoto Inc., Sylmar, Calif.) and 31.76 g of bis(2-aminophenoxy)ethane. The reactants were mixed under vacuum (10 mmHg) for 0.25 h. Polycat® 8 (0.05 g, N,N-dimethylcyclohexylamine, Air Products and Chemicals) was added and the mixture was heated at 100° C. for 24 h. The product was light brown and had a viscosity of 531 poise.

EXAMPLE 25

Synthesis of Flexible Amine-Terminated Polythioether Adduct

A 4-neck, 3-liter flask was charged with 72.02 g of Permapol® L-5534 (PRC-Desoto Inc., Sylmar, Calif.) and 31.76 g of 2,2'-(2,2'-methylenebis(oxy)bis(ethane-2,1-diyl)bis(sulfanediyl))dianiline (Example 19). The contents were mixed under vacuum (10 mmHg) for 0.25 h. Polycat® 8 (0.05 g, N,N-dimethylcyclohexylamine, Air Products and Chemicals) was added and the mixture heated at 100° C. for 24 h. The product was light brown and had a viscosity of 531 poise.

EXAMPLE 26

Flexible Amine-Terminated Polythioether Adduct and $H_{12}$MDI-Terminated Polythioether Prepolymer $H_{12}$MDI-Terminated Polythioether-Isocyanate Prepolymer
A thiol-terminated polythioether was prepared according to Example 1 of U.S. Pat. No. 6,172,179 (also referred to as Permapol® P3.1E).

vinyl ether (47.4 g) and Vazo-67 (1.2 g) was added to the flask in 1 h via a dropping funnel. The reaction mixture was maintained at 71° C. for ca. 41 h, at which time the reaction was complete. The reaction apparatus was then fitted with a vacuum line and the product heated to 94° C. Heating was continued for 1.3 h under vacuum. Following vacuum treatment, a pale yellow, viscous polythioether polyol (678.8 g) was obtained. The polythioether polyol had a hydroxyl number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C. (170° F.), followed by the addition of Desmodur® W ($H_{12}$MDI) (82.9 g) and a 0.01% solution of dibutyltin dilaurate dissolved in methyl ethyl ketone (3.9 g). The reaction mixture was maintained at 76.6° C. for ca. 7 h and then cooled to room temperature. A 1% solution of benzoyl chloride dissolved in methyl ethyl ketone (3.8 g) was then added to the reaction mixture. The resulting $H_{12}$MDI-terminated polythioether prepolymer had an isocyanate content of 4.47% and a viscosity of 282 poise.

Cured Composition
A 12"×12" thin polyethylene sheet was placed on a flat 12"×12"×¼" stainless steel plate. Four 12"×1"×⅛" spacers were placed on the edges of the polyethylene sheet. The isocyanate-terminated prepolymer described above (60.0 g), pelargonic acid (0.78 g), Ethacure® 300 (3.54 g, Albemarle Corporation, Baton Rouge, La.), and the flexible amine-terminated polythioether adduct described in Example 24 (7.45 g) were added to a plastic container. The materials were first mixed by hand and then mixed for 60 seconds at 2,300 rpm in a speed mixer (DAC 600 FVZ).

The mixed composition in the container was uniformly poured onto the polyethylene sheet between the spacers. A second 12"×12" thin polyethylene sheet was placed on the top of the composition such that the second polyethylene sheet was separated from the first polyethylene sheet by the ⅛" spacers. A second 12"×12"×¼" stainless steel plate was placed on top of the second polyethylene sheet. The composition, sandwiched between two polyethylene sheets, was cured at room temperature for 48 h, followed by 24 h curing at 140° F. Finally, the polyethylene sheets were removed to provide a flat, ⅛-in thick, cured polymer sheet.

Hardness, tensile strength and elongation, tear strength, and volume swell and weight loss in Jet Reference Fluid Type I were measured. The data is shown in Table 1.

EXAMPLE 27

Flexible Amine-Terminated Polythioether Adduct and Isocyanate-Terminated Prepolymer A 12"×12" thin polyethylene sheet was placed on a flat 12"×12"×¼" stainless steel plate. Four 12"×1"×⅛" spacers were placed on the edges of the polyethylene sheet. The $H_{12}$MDI-terminated polythioether-isocyanate prepolymer in Example 26 (75.0 g), pelargonic acid (0.90 g), Ethacure® 300 (6.57 g, Albemarle Corporation, Baton Rouge, La.) and the flexible amine-terminated polythioether adduct described in Example 25 (2.81 g) were added to a plastic container. The materials were first mixed by hand and then mixed for 60 seconds at 2300 rpm in a speed mixer (DAC 600 FVZ).

The mixed composition in the container was uniformly poured onto the polyethylene sheet between the spacers. A second 12"×12" thin polyethylene sheet was placed on the top of the composition such that the second polyethylene sheet was separated from the first polyethylene sheet by the ⅛" spacers. A second 12"×12"×¼" stainless steel plate was placed on top of the second polyethylene sheet. The composition, sandwiched between two polyethylene sheets, was cured at room temperature for 48 h, followed by 24 h curing at 140° F. Finally, the polyethylene sheets were removed provide a flat, ⅛-in thick, cured polymer sheet.

Hardness, tensile strength and elongation, tear strength, and volume swell and weight loss in Jet Reference Fluid Type I were measured. The data is shown in Table 1. Hardness was measured according to ASTM D 2240; tensile strength & elongation were measured according to ASTM D 412; tear strength was measured according to ASTM D 624 Die C; and volume swell and weight loss was measured according to SAE AS 5127/1 Section 7.4.

TABLE 1

| | Hardness Rex A | | Tensile Strength psi | | Elongation % | | Tear Strength pli | | Vol. Swell % | Wt. Loss % |
|---|---|---|---|---|---|---|---|---|---|---|
| | Dry | After Immersion | Dry | After Immersion | Dry | After Immersion | Dry | After Immersion | | |
| Example 26 | 70 | 64 | 889 | 549 | 213 | 123 | 108 | 48 | 18.85 | 0.8 |
| Example 27 | 73 | 68 | 1087 | 752 | 739 | 602 | 171 | 108 | 19.25 | 1.74 |

[5]Before exposure to Jet Reference Fluid.
[6]After one week Jet Reference Fluid Type I exposure for 140° F.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. An amine-terminated polyformal adduct selected from an adduct of Formula (4), an adduct of Formula (5), and a combination thereof:

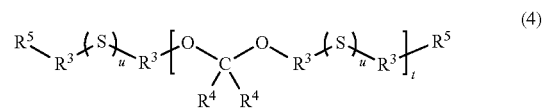

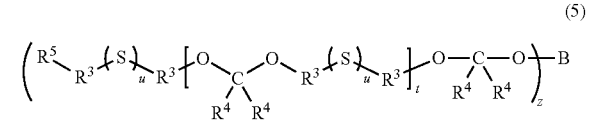

wherein:
each t is independently an integer selected from 1 to 50;
each u is independently selected from 1 and 2;
each $R^3$ is independently $C_{2-6}$ alkanediyl;
each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl;
B represents the core of a z-valent polyol $B(OH)_z$, wherein z is an integer from 3 to 6; and
each $R^5$ is independently a group comprising F, wherein F is an amine-terminated group of Formula (1'):

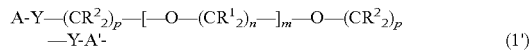

wherein:
m is an integer from 0 to 4;
each n is independently an integer from 1 to 4;
each p is independently an integer from 1 to 4;
A is amino-substituted phenyl;

-A'- is

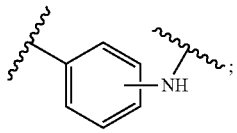

each Y is independently selected from O and S;
each $R^1$ is independently selected from hydrogen and $C_{1-3}$ alkyl; and
each $R^2$ is independently selected from hydrogen and $C_{1-3}$ alkyl.

2. A composition comprising the reaction products of reactants comprising:
 (a) an amine-terminated adduct of claim 1; and
 (b) an isocyanate-terminated prepolymer.

3. A composition comprising the reaction products of reactants comprising:
 (a) an isocyanate-terminated prepolymer selected from an isocyanate-terminated polyformal prepolymer, an isocyanate-terminated polythioether prepolymer, and a combination thereof; and
 (b) a polyamine of Formula (1):

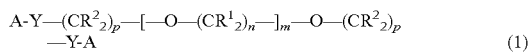

wherein:
 m is an integer from 0 to 4;
 each n is independently an integer from 1 to 4;
 each p is independently an integer from 1 to 4;
 each A is independently amino-substituted phenyl;
 each Y is independently selected from O and S;
 each $R^1$ is independently selected from hydrogen and $C_{1-3}$ alkyl; and
 each $R^2$ is independently selected from hydrogen and $C_{1-3}$ alkyl.

4. The composition of claim 3, wherein the isocyanate-terminated polyformal prepolymer is selected from a prepolymer of Formula (4), a prepolymer of Formula (5), and a combination thereof:

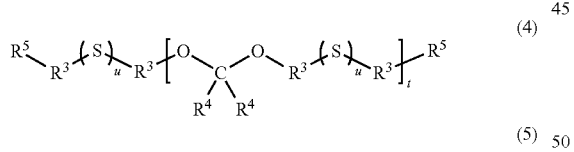

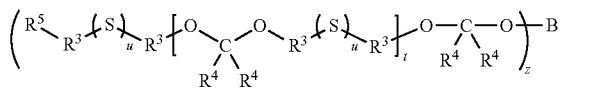

wherein:
 each t is independently an integer selected from 1 to 50;
 each u is independently selected from 1 and 2;
 each $R^3$ is independently $C_{2-6}$ alkanediyl;
 each $R^4$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl;
 B represents the core of a z-valent polyol $B(OH)_z$, wherein z is an integer from 3 to 6; and each $R^5$ is $-OR^{5'}$ wherein $R^{5'}$ comprises an isocyanate-terminated group.

5. The composition of claim 3, wherein the isocyanate-terminated polythioether prepolymer comprises the reaction products of reactants comprising:
 (a) an isocyanate-terminated polythioether comprising the reaction product of reactants comprising:
  (i) a dithiol of Formula (17):

$$HS-R^{15}-SH \qquad (17)$$

wherein:
   $R^{15}$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^{17})_s-X-]_q-(CHR^{17})_r-$; wherein:
   each $R^{17}$ is independently selected from hydrogen and methyl;
   each X is independently selected from O, S, $-NH-$, and $-NR-$ wherein R is selected from hydrogen and methyl;
   s is an integer from 2 to 6;
   q is an integer from 1 to 5; and
   r is an integer from 2 to 10; and
  (ii) a divinyl ether of Formula (26):

$$CH_2=CH-O-[-R^{25}-O-]_b-CH=CH_2 \qquad (26)$$

wherein:
   each $R^{25}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CH_2)_s-X-]_q-(CH_2)_r-$; wherein:
   each X is independently selected from $-O-$, $-S-$ and $-NR-$, wherein R is selected from hydrogen and methyl;
   each s is independently an integer from 2 to 6;
   each q is independently an integer from 0 to 5; and
   each r is independently an integer from 2 to 10; and
   each b is independently an integer from 0 to 10;
  (iii) an alkyl ω-alkenyl ether of Formula (27):

$$CH_2=CH-(CH_2)_d-O-R^{26} \qquad (27)$$

wherein:
   d is an integer from 0 to 10; and
   $R^{26}$ is selected from $C_{1-6}$ alkyl and substituted $C_{1-6}$ alkyl wherein the one or more substituents is selected from $-OH$ and $-NHR$ wherein R is selected from hydrogen and $C_{1-6}$ alkyl; and
  (iv) a polyfunctionalizing agent $B(R^8)_z$, wherein:
   B is a core of a z-valent polyfunctionalizing agent $B(R^8)_z$;
   each $R^8$ independently comprises a group selected from a group comprising a terminal group that is reactive with a $-SH$ group and a group comprising a terminal group that is reactive with a $-CH=CH_2$ group; and
   z is independently selected from an integer from 3 to 6; and
 (b) a diisocyanate.

6. A sealed aperture sealed with a sealant comprising the composition of any one of claim 2 and 3.

7. A method of sealing an aperture comprising applying a sealant comprising the composition of any one of claim 2 and 3 to the aperture and curing the sealant.

* * * * *